US010620679B2

(12) United States Patent
Sultenfuss et al.

(10) Patent No.: US 10,620,679 B2
(45) Date of Patent: Apr. 14, 2020

(54) PRIORITIZING SUPPLYING ELECTRICAL POWER BY A POWER STORAGE ADAPTER TO CONNECTED DEVICES

(71) Applicant: Dell Products L.P., Round Rock, TX (US)

(72) Inventors: Andrew Thomas Sultenfuss, Leander, TX (US); Karthikeyan Krishnakumar, Austin, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 15/694,505

(22) Filed: Sep. 1, 2017

(65) Prior Publication Data
US 2019/0073012 A1 Mar. 7, 2019

(51) Int. Cl.
*G06F 1/30* (2006.01)
*H02J 7/00* (2006.01)
*G06F 1/26* (2006.01)

(52) U.S. Cl.
CPC ............... *G06F 1/30* (2013.01); *G06F 1/263* (2013.01); *G06F 1/266* (2013.01); *H02J 7/007* (2013.01); *H02J 7/0063* (2013.01); *H02J 7/0068* (2013.01); *H02J 2007/0067* (2013.01)

(58) Field of Classification Search
CPC .. G06F 1/30; G06F 1/263; G06F 1/266; H02J 7/0063; H02J 2007/0067
See application file for complete search history.

(56) References Cited

U.S. PATENT DOCUMENTS

| 4,672,228 A | 6/1987 | Swoboda |
| 5,598,327 A | 1/1997 | Somerville et al. |
| 5,811,895 A | 9/1998 | Suzuki et al. |

(Continued)

FOREIGN PATENT DOCUMENTS

FR 2989323 10/2013

OTHER PUBLICATIONS

Universal Serial Bus, "USB Power Delivery." Retrieved from <http://www.usb.org/developers/powerdelivery/> on Jun. 28, 2017; 3 pages.

(Continued)

*Primary Examiner* — Jaweed A Abbaszadeh
*Assistant Examiner* — Gayathri Sampath
(74) *Attorney, Agent, or Firm* — Baker Botts L.L.P.

(57) ABSTRACT

A power storage adapter (PSA) may be connected to multiple battery-powered devices. A PSA controller may be configured to receive respective requests to supply electrical power to a first device and a second device, to determine that the power storage adapter does not have sufficient power supply capacity to satisfy both requests, to determine that a respective state of charge (SOC) of at least one device battery is below a first battery SOC threshold, and to prioritize supplying electrical power to a selected one of the devices at the expense of the other device based on a battery charging prioritization policy. The selected device may be prioritized until the battery SOC exceeds a battery SOC threshold or for a predetermined time period. The battery charging prioritization policy may specify relative charging priorities for the device batteries and a PSA battery dependent on whether AC line power is available.

20 Claims, 8 Drawing Sheets

(56) References Cited

U.S. PATENT DOCUMENTS

| | | | |
|---|---|---|---|
| 6,057,609 A | 5/2000 | Nagai et al. | |
| 6,293,700 B1 | 9/2001 | Lund et al. | |
| 6,477,054 B1 | 11/2002 | Hagerup | |
| 7,127,228 B2 | 10/2006 | Chang et al. | |
| 7,243,246 B2 | 7/2007 | Allen et al. | |
| 7,405,535 B2 | 7/2008 | Frerking et al. | |
| 7,536,569 B2 | 5/2009 | Montero et al. | |
| 7,538,518 B2 | 5/2009 | Wang et al. | |
| 7,545,120 B2 | 6/2009 | Breen et al. | |
| 7,592,716 B2 | 9/2009 | Zhu et al. | |
| 7,646,107 B2 | 1/2010 | Smith | |
| 7,989,981 B2 | 8/2011 | Zhang | |
| 8,164,904 B2 | 4/2012 | Matz et al. | |
| 8,188,594 B2 | 5/2012 | Ganesan et al. | |
| 9,166,083 B2 | 10/2015 | Meinel et al. | |
| 9,172,219 B2 | 10/2015 | Mills et al. | |
| 9,197,092 B2 | 11/2015 | Verdun et al. | |
| 9,263,912 B2 | 2/2016 | Verdun et al. | |
| 9,300,015 B2 | 3/2016 | Chang et al. | |
| 9,524,018 B2 | 12/2016 | Sultenfuss et al. | |
| 9,568,990 B2 | 2/2017 | Chueh et al. | |
| 9,681,558 B2 | 6/2017 | Chen et al. | |
| 9,693,446 B2 | 6/2017 | Ragg | |
| 9,812,878 B1 | 11/2017 | Stieber et al. | |
| 9,867,275 B2 | 1/2018 | Chen | |
| 9,887,571 B1 | 2/2018 | Sultenfuss et al. | |
| 10,128,764 B1 | 11/2018 | Vinciarelli | |
| 10,181,731 B1 | 1/2019 | Thompson et al. | |
| 10,181,739 B1 | 1/2019 | Thompson et al. | |
| 2003/0085626 A1 | 5/2003 | Odaohhara | |
| 2003/0212923 A1 | 11/2003 | Coppock et al. | |
| 2004/0075418 A1 | 4/2004 | Densham et al. | |
| 2004/0125618 A1 | 7/2004 | Rooij et al. | |
| 2004/0135565 A1 | 7/2004 | Douma et al. | |
| 2005/0052164 A1 | 3/2005 | Sakai et al. | |
| 2005/0125709 A1 | 6/2005 | McKim | |
| 2005/0131645 A1 | 6/2005 | Panopoulos | |
| 2005/0141252 A1 | 6/2005 | Mollo | |
| 2005/0174094 A1 | 8/2005 | Purdy et al. | |
| 2005/0275383 A1 | 12/2005 | Ishishita | |
| 2006/0022637 A1 | 2/2006 | Wang et al. | |
| 2006/0164038 A1 | 7/2006 | Demers et al. | |
| 2007/0079153 A1 | 4/2007 | Bain | |
| 2007/0103110 A1 | 5/2007 | Sagoo | |
| 2007/0200433 A1 | 8/2007 | Kelty | |
| 2007/0248877 A1 | 10/2007 | Qahoug | |
| 2007/0279004 A1 | 12/2007 | Wang et al. | |
| 2008/0222431 A1* | 9/2008 | Paniagua | G06F 1/26 713/300 |
| 2008/0315826 A1* | 12/2008 | Alberth, Jr. | H02J 7/0013 320/101 |
| 2009/0001937 A1 | 1/2009 | Densham et al. | |
| 2009/0066294 A1* | 3/2009 | Sabram | H02J 7/0013 320/137 |
| 2009/0076661 A1 | 3/2009 | Pearson et al. | |
| 2009/0146826 A1 | 6/2009 | Gofman et al. | |
| 2009/0177906 A1 | 7/2009 | Paniagua, Jr. et al. | |
| 2009/0244944 A1 | 10/2009 | Jang et al. | |
| 2010/0038963 A1 | 2/2010 | Shetty et al. | |
| 2010/0067197 A1 | 3/2010 | Guccione et al. | |
| 2011/0045327 A1 | 2/2011 | Yawata et al. | |
| 2011/0068626 A1 | 3/2011 | Terlizzi et al. | |
| 2011/0183178 A1 | 7/2011 | Sohn | |
| 2011/0225073 A1 | 9/2011 | Won et al. | |
| 2011/0227407 A1 | 9/2011 | Ransom | |
| 2011/0260681 A1 | 10/2011 | Guccione et al. | |
| 2011/0293984 A1 | 12/2011 | Han et al. | |
| 2012/0025630 A1 | 2/2012 | Tsuda | |
| 2012/0084575 A1 | 4/2012 | Flores et al. | |
| 2012/0091815 A1 | 4/2012 | Richards, III | |
| 2012/0123604 A1 | 5/2012 | Littrell | |
| 2012/0151240 A1 | 6/2012 | Robinson et al. | |
| 2012/0181990 A1 | 7/2012 | Asakura et al. | |
| 2012/0201062 A1 | 8/2012 | Lee | |
| 2012/0256484 A1 | 10/2012 | Kemp | |
| 2012/0316695 A1 | 12/2012 | Chen | |
| 2012/0319656 A1 | 12/2012 | Toma | |
| 2013/0043827 A1 | 2/2013 | Weinstein et al. | |
| 2013/0100568 A1 | 4/2013 | Mistry et al. | |
| 2013/0159792 A1 | 6/2013 | Brooks et al. | |
| 2013/0314039 A1 | 11/2013 | Weber et al. | |
| 2013/0342011 A1 | 12/2013 | Robinson et al. | |
| 2014/0018969 A1 | 1/2014 | Forbes | |
| 2014/0035380 A1* | 2/2014 | Stevens | H02J 5/005 307/104 |
| 2014/0070774 A1 | 3/2014 | Terlizzi et al. | |
| 2014/0157065 A1 | 6/2014 | Ong | |
| 2014/0210267 A1 | 7/2014 | Ishida et al. | |
| 2014/0214223 A1 | 7/2014 | Tsunoda et al. | |
| 2014/0217958 A1 | 8/2014 | Verdun et al. | |
| 2014/0239882 A1 | 8/2014 | Yang | |
| 2015/0037662 A1 | 2/2015 | Pinon et al. | |
| 2015/0063473 A1 | 3/2015 | Nishibayashi | |
| 2015/0132615 A1 | 5/2015 | Yun | |
| 2015/0165917 A1* | 6/2015 | Robers | B60L 3/12 320/109 |
| 2015/0364921 A1 | 12/2015 | Tatsuta et al. | |
| 2016/0072317 A1* | 3/2016 | Guz | H02J 7/0021 320/162 |
| 2016/0099608 A1* | 4/2016 | Jao | H02J 9/06 307/19 |
| 2016/0231777 A1 | 8/2016 | Decamp | |
| 2016/0241148 A1* | 8/2016 | Kizilyalli | H05K 5/0247 |
| 2016/0246316 A1 | 8/2016 | Lim et al. | |
| 2016/0274607 A1 | 9/2016 | Kudo | |
| 2016/0329612 A1 | 11/2016 | Jung | |
| 2016/0359426 A1 | 12/2016 | Jitaru et al. | |
| 2017/0040815 A1 | 2/2017 | Todasco | |
| 2017/0077738 A1 | 3/2017 | Park | |
| 2017/0085098 A1 | 3/2017 | Sporck et al. | |
| 2017/0104330 A1 | 4/2017 | Nakaishi | |
| 2017/0126041 A1 | 5/2017 | Sato | |
| 2017/0177069 A1 | 6/2017 | Bedare et al. | |
| 2017/0225586 A1 | 8/2017 | Zhang et al. | |
| 2017/0293335 A1 | 10/2017 | Dunstan et al. | |
| 2018/0143916 A1 | 5/2018 | Gupta et al. | |
| 2018/0181171 A1 | 6/2018 | Jang et al. | |
| 2018/0233914 A1 | 8/2018 | Miki et al. | |
| 2018/0351399 A1 | 12/2018 | Frey | |
| 2018/0375358 A1 | 12/2018 | Sultenfuss et al. | |
| 2018/0375359 A1 | 12/2018 | Sultenfuss et al. | |
| 2018/0375360 A1 | 12/2018 | Sultenfuss et al. | |
| 2018/0375361 A1 | 12/2018 | Sultenfuss et al. | |
| 2019/0050037 A1 | 2/2019 | Wang et al. | |

OTHER PUBLICATIONS

SMBus, "System Management Bus (SMBus)." Retrieved from <www.smbus.org> on Jun. 28, 2017; 2 pages.

UEFI, "Unified Extensible Firmware Interface (UEFI) Specification", Retrieved from <http://uefi.org> May 2017; 2899 pages.

Wikipedia, "USB." Retrieved from <https://en.wikipedia.org/wiki/USB> on Mar. 19, 2017; 35 pages.

Notice of Allowance and Fee(s) Due for U.S. Appl. No. 15/631,467, filed Jun. 23, 2017, dated Sep. 29, 2017; 13 pages.

Waffenschmidt, Eberhard. "Qi Coupling Factor." Qi Coupling Factor, www.wirelesspowerconsortium.com/technology/coupling-factor.html, Retrieved Jan. 3, 2018; 5 pages.

Waffenschmidt, Eberhard. "Resonant Coupling." Resonant Coupling, https://www.wirelesspowerconsortium.com/technology/resonant-coupling.html; Retrieved Jan. 3, 2018; 4 pages.

Wow! A true free-positioning 5-phone charger—Wireless Power Consortium Blog. Wireless Power Consortium. Web. <http://www.wirelesspowerconsortium.com/blog/67/wow-a-true-free-positioning-5-phone-charger>; Retrieved Jan. 3, 2018; 6 pages.

Received STIC search report from EIC 2800 searcher John DiGeronimo dated Dec. 7, 2017; 31 pages.

Received STIC search report from EIC 2800 searcher Benjamin Martin dated Sep. 28, 2017; 14 pages.

(56) References Cited

OTHER PUBLICATIONS

English machine translation of Souad et al. (FR 2989323) published Oct. 18, 2013.

* cited by examiner

PRIORITIZING SUPPLYING ELECTRICAL POWER BY A POWER STORAGE ADAPTER TO CONNECTED DEVICES

BACKGROUND

Field of the Disclosure

This disclosure relates generally to information handling systems and, more particularly, to prioritizing supplying electrical power by a power storage adapter to connected devices.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed power storage adapter (PSA) includes a plurality of PSA ports, an AC-DC converter, a PSA battery, and a PSA controller. The PSA controller may have access to memory media storing instructions executable by the PSA controller to receive respective requests to supply electrical power to a first battery-powered device at a first PSA port and to a second battery-powered device at a second PSA port, to determine that the power storage adapter does not have sufficient power supply capacity to satisfy both requests, to determine that a respective state of charge (SOC) of at least one of a first battery of the first device and a second battery of the second device is below a first battery SOC threshold, and to prioritize supplying electrical power to a selected one of the first device and the second device at the expense of an unselected one of the first device and the second device dependent on a predetermined battery charging prioritization policy, the state of charge of the selected device being below the first battery SOC threshold. Prioritizing supplying electrical power to the selected device may include supplying an amount of electrical power to the unselected device that is less than the electrical power requested for the unselected device.

In any of the disclosed embodiments of the power storage adapter, prioritizing supplying electrical power to the selected device may include prioritizing supplying electrical power to the selected device until the state of charge of the battery of the selected device meets or exceeds the first battery SOC threshold.

In any of the disclosed embodiments, prioritizing supplying electrical power to the selected device may include prioritizing supplying electrical power to the selected device until the state of charge of the battery of the selected device meets or exceeds a second battery SOC threshold, the second battery SOC threshold being higher than the first battery SOC threshold.

In any of the disclosed embodiments, prioritizing supplying electrical power to the selected device may include prioritizing supplying electrical power to the selected device for a predetermined period of time.

In any of the disclosed embodiments, determining that a respective SOC of at least one of the first battery and the second battery is below a first battery SOC threshold may include at least one of querying the first device to obtain data representing the state of charge of the first battery, and querying the second device to obtain data representing the state of charge of the second battery.

In any of the disclosed embodiments, the instructions may be further executable by the PSA controller to determine that the state of charge of the unselected device is below the first battery SOC threshold, and subsequent to prioritizing supplying electrical power to the selected device, to prioritize supplying electrical power to the unselected device at the expense of the selected device.

In any of the disclosed embodiments, prioritizing supplying electrical power to the selected device may include supplying an amount of electrical power to the selected device equal to the electrical power requested for the selected device.

In any of the disclosed embodiments, the instructions may be further executable by the PSA controller to, subsequent to prioritizing supplying electrical power to the selected device, determine that the respective state of charge of each of the first battery and the second battery exceeds the first battery SOC threshold, and cause the power storage adapter to supply to each of the first device and the second device, in accordance with the predetermined battery charging prioritization policy, an amount of electrical power that is less than the electrical power requested for the device.

In any of the disclosed embodiments, the AC-DC converter may be connected to an AC line power source, and the instructions may be further executable by the PSA controller to, subsequent to prioritizing supplying electrical power to the selected device, prioritize supplying electrical power to the PSA battery at the expense of the selected device and the unselected device.

In any of the disclosed embodiments, the first device may be a portable information handling system, the first battery may be an internal battery of the portable information handling system, and the battery charging prioritization policy may specify that a charging priority of the internal battery of the portable information handling system is higher than a charging priority of the second battery when the state of charge of the internal battery and the state of charge of the second battery are below the first battery SOC threshold.

In any of the disclosed embodiments, the instructions may be further executable by the PSA controller to determine that a state of charge of the PSA battery is below a battery SOC threshold for the PSA battery, and the battery charging prioritization policy may specify relative charging priorities for the first battery, the second battery and the PSA battery, the relative charging priorities being dependent on whether or not the AC-DC convertor is connected to an AC line power source.

In a further aspect, a disclosed method is for prioritizing supplying electrical power by a power source to connected devices. The method may include receiving, by a power source, respective requests to supply electrical power to a first battery-powered device connected to the power source and to a second battery-powered device connected to the power source, determining that the power source does not have sufficient power supply capacity to satisfy both requests, determining that a respective state of charge (SOC) of at least one of a first battery of the first device and a second battery of the second device is below a first battery SOC threshold, and prioritizing supplying electrical power to a selected one of the first device and the second device at the expense of an unselected one of the first device and the second device dependent on a predetermined battery charging prioritization policy, the state of charge of the selected device being below the first battery SOC threshold. Prioritizing supplying electrical power to the selected device may include supplying an amount of electrical power to the unselected device that is less than the electrical power requested for the unselected device.

In any of the disclosed embodiments, prioritizing supplying electrical power to the selected device may include prioritizing supplying electrical power to the selected device until the state of charge of the battery of the selected device meets or exceeds the first battery SOC threshold.

In any of the disclosed embodiments, prioritizing supplying electrical power to the selected device may include prioritizing supplying electrical power to the selected device until the state of charge of the battery of the selected device meets or exceeds a second battery SOC threshold, the second battery SOC threshold being higher than the first battery SOC threshold.

In any of the disclosed embodiments, prioritizing supplying electrical power to the selected device may include prioritizing supplying electrical power to the selected device for a predetermined period of time.

In any of the disclosed embodiments, determining that a respective SOC of at least one of the first battery and the second battery is below a first battery SOC threshold may include at least one of querying the first device to obtain data representing the state of charge of the first battery, and querying the second device to obtain data representing the state of charge of the second battery.

In any of the disclosed embodiments, the state of charge of the unselected device may be below the first battery SOC threshold, and the method may further include, subsequent to prioritizing supplying electrical power to the selected device, prioritizing supplying electrical power to the unselected device at the expense of the selected device.

In any of the disclosed embodiments, prioritizing supplying electrical power to the selected device may include supplying an amount of electrical power to the selected device equal to the electrical power requested for the selected device.

In any of the disclosed embodiments, the method may further include, subsequent to prioritizing supplying electrical power to the selected device, determining that the respective state of charge of each of the first battery and the second battery exceeds the first battery SOC threshold, and causing the power source to supply to each of the first device and the second device, in accordance with the predetermined battery charging prioritization policy, an amount of electrical power that is less than the electrical power requested for the device.

In any of the disclosed embodiments, the power source may be a power storage adapter (PSA) including a PSA battery and an AC-DC converter connected to an AC line power source, and the method may further include, subsequent to prioritizing supplying electrical power to the selected device, prioritizing supplying electrical power to the PSA battery at the expense of the selected device and the unselected device.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
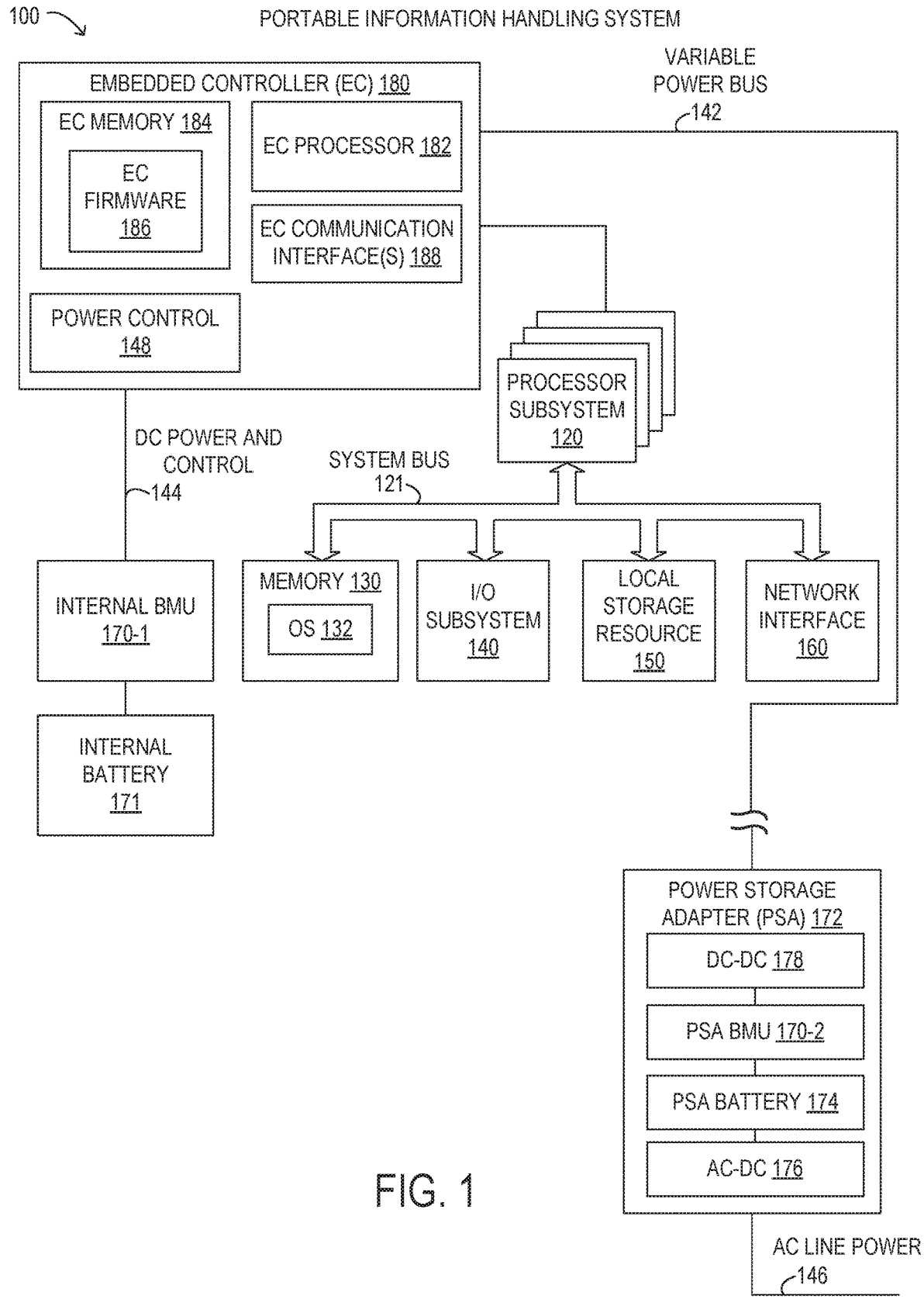
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3A, 3B, 4, 5, 6 and 7, wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170-1 that manages an internal battery 171. Furthermore, information handling system 100 is shown removably coupled to a power storage adapter 172 that incorporates various high efficiency features for use with portable information handling system 100, as disclosed herein. As shown, power storage adapter 172 may be an external device to portable information handling system 100 and may be coupled to portable information handling system 100 using a variable power bus 142, for example, using an appropriate connector, as described in further detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170-1. Thus, EC processor 182 may have access to EC memory 184, which may store EC firmware 186, representing instructions executable by EC processor 182.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for managing electrical power connections between power storage adapter 172, internal BMU 170-1, and to portable information handling system 100. In some embodiments, power control 148 may be implemented as a separate controller external to embedded controller 180. For example, when variable power bus 142 supplies electrical power to portable information handling system 100, power control 148 may determine whether the electrical power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of power during the low power state and managing operation of portable information handling system 100 during the low power state. Power control 148 may accordingly route electrical power and communicate with internal BMU 170-1 via DC power and control 144, which may represent suitable connections between embedded controller 180 and internal BMU 170-1, for example. It is noted that in some embodiments, at least certain portions of power control 148 may be implemented using EC firmware 186, such as specialized executable instructions for power management and control.

In particular embodiments, embedded controller 180 may support a variable power bus 142, which may represent a data bus that also carries and distributes electrical power to and from portable information handling system 100. In various embodiments, variable power bus 142 supports different levels of direct-current (DC) power that may be provided to certain peripherals connected to I/O subsystem 140. In particular embodiments, variable power bus 142 may be used to receive DC power from an external source, such as a power storage adapter 172. For example, the DC power received from the external source may be routed via DC power connection 144 to internal BMU 170-1 for purposes of charging internal battery 171 or otherwise powering portable information handling system 100.

In certain embodiments, variable power bus 142 is implemented according to an industry standard, such as a Universal Serial Bus (USB), which is developed and supported by the USB Implementers Forum, Inc. (USB IF, www.usb.org). In particular, variable power bus 142 may be implemented as a USB Type-C bus that may support different USB devices, such as USB Type-C devices with USB Type-C connectors. Accordingly, variable power bus 142 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF (http://www.usb.org/developers/powerdelivery/). Examples of source power rules governed by the USB Power Delivery Specification, revision 2.0, version 1.2 are given in Table 1 below.

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
|---|---|---|---|---|
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 W to 100 W.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

As illustrated in FIG. 1, each of portable information handling system 100 and power storage adapter 172 may include a battery management unit (BMU) 170 that controls operation of a respective battery. In particular implementations, BMU 170 may be embedded within a respective battery whose operation BMU 170 controls. For example, internal BMU 170-1 within portable information handling system 100 may control operation of an internal battery 171, while PSA BMU 170-2 within power storage adapter 172 may control operation of a PSA battery 174. More specifically, BMU 170-1 may monitor information associated with, and control charging operations of, internal battery 171, while BMU 170-2 may monitor information associated with, and control charging operations of, PSA battery 174. In operation, each BMU 170 may control operation of a respective battery to enable sustained operation, such as by protecting the battery. Protection of the battery by BMU 170 may comprise preventing the battery from operating outside of safe operating conditions, which may be defined in terms of certain allowable voltage and current ranges over which the battery can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, a battery (such as internal battery 171 or PSA battery 174 illustrated in FIG. 1) may be considered to be discharged when an SOC of the battery corresponds to an SOC that is below a predetermined threshold percentage or amount below the 100% charge level given by the TOC voltage, such as below a 5% charge level in one example. A battery may be considered to be charged, i.e., at least partially charged, when the SOC for the battery corresponds to an SOC that is above a first predetermined threshold percentage or amount below the 100% charge level given by the TOC voltage, such as above the 25% charge level in one example. A battery may be considered to be fully charged when the SOC of the battery corresponds to an SOC that is above a second predetermined threshold percentage or amount below the 100% charge level given by the TOC voltage, such as above the 95% charge level for example. A battery may be considered to be at least partially discharged when the SOC of the battery corresponds to an SOC that is below the 100% charge level. The parameters for specifying an SOC described above are examples and may be modified using different values in different embodiments.

In various embodiments, a battery (such as internal battery 171 or PSA battery 174 illustrated in FIG. 1) may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electrochemistries, or one or more cells based a different electrochemistry than Lithium-ion.

As shown in FIG. 1, power storage adapter 172 may be designed to removably couple to portable information handling system 100 using variable power bus 142. For example, variable power bus 142 may include power connections for electrically coupling power storage adapter 172 to portable information handling system 100 as an external load on power storage adapter 172. Variable power bus 142 may also include a communication link to enable power storage adapter 172 to communicate with portable information handling system 100, such as via embedded controller 180. For example, power storage adapter 172 may communicate battery data collected locally at power storage adapter 172 to portable information handling system 100 over a communication link within variable power bus 142. In other embodiments, there may be a communication link between power storage adapter 172 and portable information handling system 100 that is separate from variable power bus 142 instead of, or in addition to, a communication link that is part of variable power bus 142. In some embodiments, a communication link between power storage adapter 172 and portable information handling system 100, or DC power and control 144, may operate in accordance with a System Management Bus (SMBus) protocol for sending and receiving data. As noted above, in particular embodiments, variable power bus 142 is compatible with USB Type-C and may be implemented according to USB Type-C and USB Power Delivery specifications promulgated by USB IF.

In various embodiments, each of internal battery 171 or PSA battery 174 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. A temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, each BMU 170 may include a charging unit (see FIG. 2, charging unit 246) that may control charging cycles for a battery and may apply a TOC voltage as a threshold to determine when charging is complete as the battery voltage increases during charging. The TOC voltage may be lower than or equal to the maximum charge voltage that the battery can physically sustain, in different embodiments. Depending on the actual value for the TOC voltage, a given energy capacity may be stored using the battery. BMU 170 may also be enabled to obtain various types of information associated with a battery and to make decisions according to the obtained information. For example, each BMU 170 may monitor various charging-related parameters or other operating parameters received from one or more batteries, including parameters received from a local battery or parameters received from a remote battery over variable power bus 142.

In some embodiments, parameters monitored by a BMU 170 may include a charging current, a voltage, and a temperature associated with a battery. More specifically, the parameters monitored by the BMU 170 may include any or all of the cell configuration and chemistry of battery cells within the battery, the total voltage of the battery, the voltages of individual battery cells, minimum or maximum cell voltages, the average temperature of the battery as a whole, the temperatures of individual battery cells, the SOC of the battery, the depth of discharge of the battery, the current flowing into the battery, the current flowing out of the battery, and any other measurement of the overall condition of the battery, in various embodiments. In some embodiments, monitoring the SOC may include continuous or periodic monitoring of battery output current, voltage, or both. In some cases, Coulomb counting, in which the charge delivered or stored by a battery is tracked, is used for battery monitoring. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to another device, such as information associated with PSA battery 174 that is provided to or obtained by PSA BMU 170-2 on power storage adapter 172, and which may be provided to portable information handling system 100 over variable power bus 142.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100 or power storage adapter 172, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof. In some embodiments, information indicating an alert condition for PSA battery 174 that is detected by PSA BMU 170-2 on power storage adapter 172 may be provided to portable information handling system 100 over variable power bus 142.

In various embodiments, BMU 170 may further include a DC boost converter (see FIG. 2, DC boost converter 248) that is capable of boosting the voltage provided by the cells within a battery. The DC boost converter may be externally controlled to provide a desired boost voltage output from the battery, such as in response to a control signal or other trigger condition. Because the internal output voltage of the battery may be constrained by the particular battery electrochemistry used to implement the cells, the DC boost converter may enable the battery to output a higher voltage, as desired. In some embodiments, the DC boost converter may be a buck-boost type converter that can step up or step down an input DC voltage.

In some embodiments, embedded controller 180 may implement a voltage control module that senses the current drawn by an electrical load and provides a control signal to BMU 170-1 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control BMU 170-1 to produce a particular voltage at the load. For example, the particular voltage level may allow the load to operate in a desired mode of operation. In one embodiment, the particular voltage level indicated by the voltage set signal may be higher than the voltage output by cells within a battery. BMU 170-1 may boost the voltage output by the cells to the voltage indicated by the voltage set signal.

For example, in some embodiments, a battery (such as internal battery 171 or PSA battery 174 illustrated in FIG. 1) may provide electrical power to the information handling system 100 at an output voltage controlled by its respective BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information, and may provide voltage control information based on the determined voltage level to internal BMU 170-1 or PSA BMU 170-2. In one embodiment, voltage control information provided to PSA BMU 170-2 may specify the output voltage level of power storage adapter 172. In another embodiment, voltage control information provided to PSA BMU 170-2 may indicate a preferred voltage range for the output voltage level of power storage adapter 172. In yet another embodiment, voltage control information provided to PSA BMU 170-2 may indicate that the output voltage level of power storage adapter 172 should be increased or should be decreased.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein.

In FIG. 1, power storage adapter 172 is shown receiving AC line power 146 as an external power source. AC line power 146 may represent a connection to line power, such as using a standard line power cable. In some embodiments, AC line power 146 may be a removable connection, such as a cable that plugs into line power in a wall socket, and plugs into a corresponding receptacle included with power storage adapter 172. Also included within power storage adapter 172 in FIG. 1 is AC-DC converter 176. AC-DC converter 176 may receive alternating current (AC) from AC line power 146 and may output one or more DC voltages for supplying electrical power to other components in power storage adapter 172. For example, an output DC voltage from AC-DC converter 176 may be supplied to PSA battery 174 for charging purposes. An output DC voltage from AC-DC converter 176 may be supplied to a DC-DC converter 178, which may then generate one or more other DC voltages.

Also, an output DC voltage from AC-DC converter 176 may be directly supplied to variable power bus 142, such as to fulfil a power contract, as described above. Additional details of power storage adapter 172 are described below with respect to FIG. 2 and FIGS. 3A and 3B.

In some embodiments, in operation, power storage adapter 172 may supply portable information handling system 100 with electrical power, as governed by a power delivery contract as described above. However, under certain conditions, the power delivery contract may not be desirable to maintain optimal efficiency and long run times under battery power. For example, when power storage adapter 172 is not connected to AC line power 146, PSA battery 174 is available as a power source for supplying electrical power to portable information handling system 100. Furthermore, during certain charging regimes, such as when portable information handling system 100 is in a low power state and is drawing very little current to charge internal battery 171, portable information handling system 100 may draw substantially less electrical power than specified in the power delivery contract. When portable information handling system 100 draws a relatively low electrical power, such as less than about 1 Watt, the efficiency for supplying electrical power from internal battery 171 is substantially reduced, because certain losses due to inefficiency, such as thermal losses, will comprise a much greater relative portion of the total output power supplied by power storage adapter 172.

In some embodiments, when power storage adapter 172 is not connected to AC line power 146 and the electrical power actually supplied to portable information handling system 100 is relatively low, power storage adapter 172 may independently decide to terminate the power storage contract and to wait until such time as internal battery 171 will draw greater electrical power for charging, for example, when internal battery 171 reaches a state of charge that is less than a recharging state of charge, and will draw greater amounts of electrical power from power storage adapter, which will be more efficient.

In some embodiments, power storage adapter 172 may include a high efficiency architecture for power distribution. Specifically, power storage adapter 172 may include a 20V_AC bar that is used to directly supply electrical power externally via ports 230, as well as supplying electrical power for internal purposes. In this manner, power storage adapter 172 may eliminate a voltage regulator for a 20V output voltage, thereby reducing losses from the potential use of the 20V voltage regulator. Furthermore, the 20V_AC bar may supply electrical power to a DC boost converter that can boost an output of a PSA battery to provide 20V boost current that can be used to augment the output power supplied by power storage adapter 172 from an AC line power source. A charging unit may be used to boost a charging voltage of the PSA battery in order to more efficiently charge the PSA battery. In some configurations, a battery voltage $V_{BAT}$ may be used to directly supply electrical power via ports 230. The battery voltage $V_{BAT}$ may generally be in the range of 5V-20V, and may have other ranges in different embodiments, such as a range of 10V-20V, 5V-15V, 12V-20V, or 12V-16.8V in particular embodiments. Various features and advantages of such an architecture for power storage adapter 172 are described in further detail herein.

In at least some embodiments of the present disclosure, system controls and/or power storage adapter ratings may not support supplying electrical power at the maximum charge rate to all batteries and/or enabling maximum system operation at the same time. The power storage adapters described herein may, under certain circumstances, prioritize supplying electrical power to a selected one of multiple connected devices or for PSA battery charging. For example, if a power storage adapter does not have sufficient power supply capacity to satisfy respective requests for power from the battery-powered devices connected to the power storage adapter and the state of charge of one or more of the device batteries is below a battery SOC threshold, the power storage adapter may be configured to select one of the connected devices for which the battery SOC is below the battery SOC threshold to receive priority. The power storage adapter may prioritize supplying electrical power to the selected device at the expense of other connected devices, at least temporarily. For example, the power storage adapter may supply up to the maximum amount of requested electrical power to the selected device and may supply less than the requested amount of electrical power to the other connected devices. If the battery SOC of the PSA battery is below a battery SOC threshold for the PSA battery, the power storage adapter may, under certain circumstances, prioritize supplying electrical power for charging the PSA battery at the expense of any or all connected devices.

The techniques described herein may be used to dynamically optimize charging order for a power storage adapter, for a power companion, or for any multi-battery system in situations in which a power source cannot satisfy all requests to supply power to connected battery-powered devices. These techniques may be well suited for implementation with small adapters, or at any time when system power plus the maximum charge rate for a battery (or batteries) exceeds the power storage adapter output. These techniques may also be useful when the charge time available from the power storage adapter is not long enough to fully charge all the batteries in the system while operating the system at full power. In certain circumstances, the power storage adapters described herein (or, more specifically, the PSA controller thereof) may prioritize system power (performance) over PSA battery charging. In addition, the power storage adapters may apply a battery charging prioritization policy to determine to which device (e.g., the PSA battery, a portable information system connected to a first PSA port, or another device connected to a second PSA port) electrical power should be supplied at any given time. In some embodiments, the decision may be a question of the total energy transferred into the connected devices (e.g., to achieve a maximum runtime), or where energy is (or should be) stored. For example, if the power storage adapter is connected to an AC line power source, if neither the internal battery of the portable information system nor the PSA battery is fully charged, and if the information handling system will be used without the power storage adapter in the near future, supplying electrical power to the portable information system (e.g., in order to allow the internal battery to be charged) may be prioritized over the charging of the PSA battery and/or supplying electrical power to any other devices connected to the power storage adapter.

Figure 2:
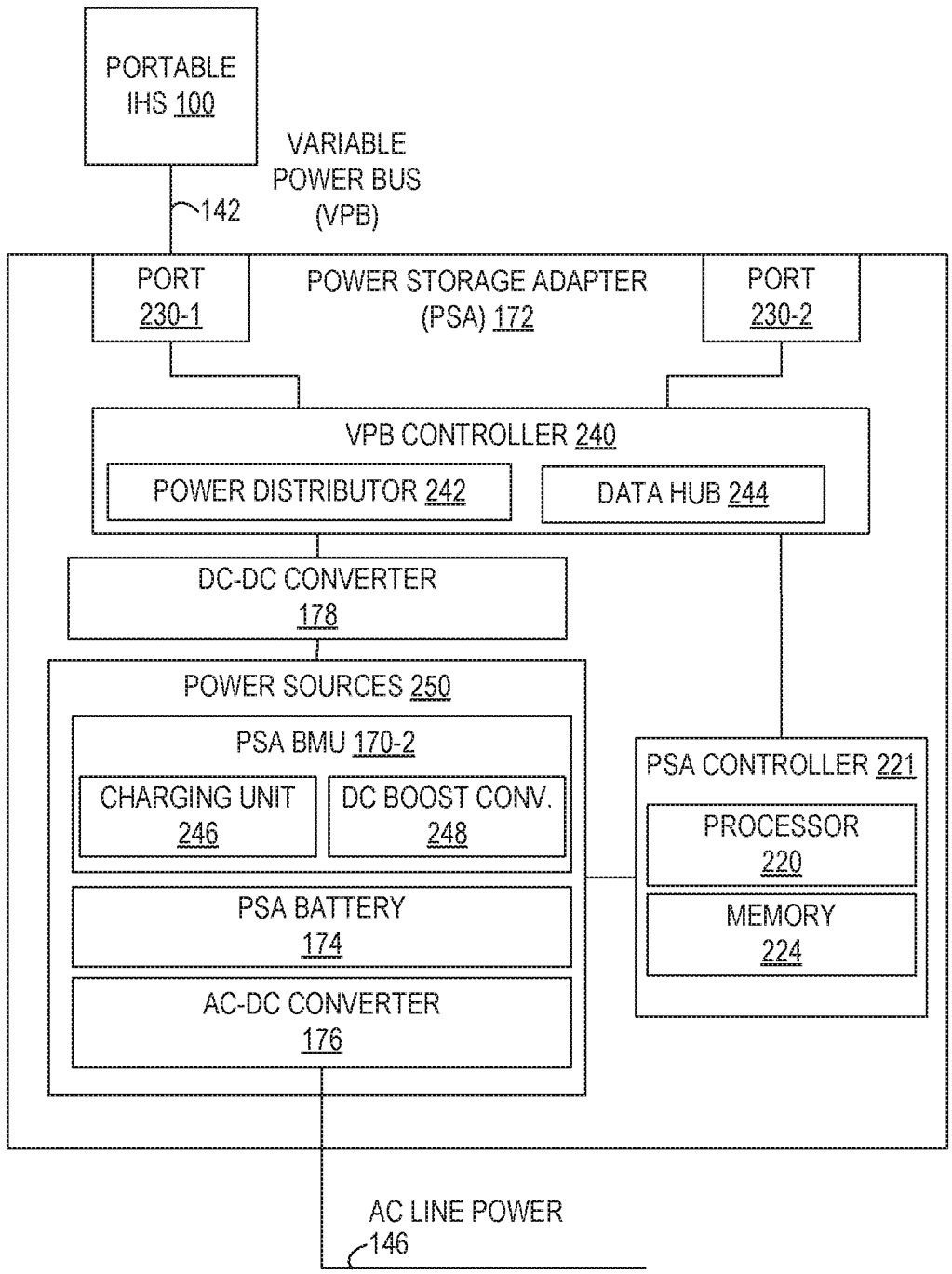
FIG. 2 is a block diagram of selected elements of an embodiment of a portable information handling system with an external power storage adapter.

Referring now to FIG. 2, selected elements of an embodiment of a system 200 with portable information handling system 100 and power storage adapter 172 are shown. FIG. 2 illustrates further internal details of power storage adapter 172. It is noted that FIG. 2 is not drawn to scale but is a schematic illustration. In various embodiments, power storage adapter 172 may be implemented using fewer or additional components than illustrated in FIG. 2.

In FIG. 2, power storage adapter 172 is coupled to portable information handling system 100 via variable power bus (VPB) 142, as described above with respect to FIG. 1. Additionally, power storage adapter 172 is also externally connected to AC line power 146, as described above with respect to FIG. 1.

As shown in FIG. 2, power storage adapter 172 includes power sources 250, a DC-DC converter 178, a VPB controller 240, and two ports 230, as well as a PSA controller 221 comprising processor 220 and memory 224. As shown, power sources 250 comprise an AC-DC converter 176, a PSA battery 174, and a PSA BMU 170-2. In FIG. 2, PSA BMU 170-2 is shown including a charging unit 246 and a DC boost converter 248, while VPB controller 240 is shown including a power distributor 242 and a data hub 244. In some embodiments, DC boost converter 248 may include buck-boost DC conversion functionality to step up or step down an input DC voltage. VBP controller 240 is depicted in FIG. 2 in an implementation with two ports 230-1 and 230-2 that support variable power bus 142. As noted above, variable power bus 142 may be compatible with USB Type-C specifications promulgated by USB IF. Accordingly, in particular embodiments, port 230-1 may be a USB Type-C port. In different embodiments, port 230-1 may also be a USB Type-C port or another type of port, such as a USB Type-A port, among others. Although two ports 230 are shown in the example embodiment of FIG. 2, it will be understood that power storage adapter 172 may include fewer or more ports 230 in different embodiments.

As shown in FIG. 2, power storage adapter 172 includes PSA controller 221, which may perform various actions and functions. In some embodiments, PSA controller 221 is implemented using a custom integrated circuit, or a customizable integrated circuit, such as a field programmable gate array (FPGA). In the embodiment shown in FIG. 2, PSA controller 221 includes processor 220 and memory 224, which may store executable instructions (such as executable code) that may be executed by processor 220, which has access to memory 224. Processor 220 is typically implemented as an integrated circuit, such as a microprocessor or microcontroller, and is enabled to execute instructions that cause power storage adapter 172 to perform the functions and operations described herein. For the purposes of this disclosure, memory 224 may include non-transitory computer-readable media that stores data and instructions for at least a period of time. Memory 224 may comprise persistent and volatile media, fixed and removable media, and magnetic and semiconductor media. Memory 224 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM) or flash memory, non-transitory media, or various combinations of the foregoing. Memory 224 is operable to store instructions, data, or both. Memory 224 may store sets or sequences of instructions that may represent executable computer programs for implementing various functionality provided by power storage adapter 172.

The functionality and implementation details of certain elements in power storage adapter 172, such as AC-DC converter 176, PSA battery 174, PSA BMU 170-2, and DC-DC converter 178, are described above with respect to FIG. 1.

As shown, VPB controller 240 may include power distributor 242, which may represent various electronic components that enable distribution of DC power with respect to variable power bus 142 via ports 230. Specifically, power distributor 242 may receive at least one DC power input from DC-DC converter 178. Power distributor 242 may route or switch power connections to respective ports 230, for example, to enable fulfillment of a power contract, as described above. A power contract established by VPB controller 240, such as according to a USB Power Delivery Specification, may govern the supply of DC power to portable information handling system 100 via port 230-1. VPB controller 240 may also establish another power contract to supply DC power to another device coupled to port 230-2. In some embodiments, VPB controller 240 supplies DC power to both port 230-1 and port 230-2. Power distributor 242 may supply different DC voltages for output power at different ports 230. In particular embodiments, power distributor 242 supplies a different DC voltage to port 230-1 than to port 230-2.

In FIG. 2, data hub 244 may represent electronic functionality to manage various VPB connections over variable power bus 142. Specifically, data hub 244 may control operation of power distributor 242 and may, in turn, be controlled by PSA controller 221, such as by executable code (not shown) stored in memory 224 and executed by processor 220. Additionally, data hub 244 may store state information for each respective port 230, such as USB state information. For example, data hub 244 may store information associated with power contracts that power storage adapter 172 has established or is in the process of negotiating. Accordingly, data hub 244 may store various information about different VPB devices connected to power storage adapter 172 via ports 230. As used herein, the phrase "power consuming device" may refer to any system, apparatus, or device consuming the electrical power provided by a battery. For example, a portable information handling system may consume power for components such as one or more displays, processors, storage media, memory, or other components.

In the illustrated embodiment, charging unit 246 of BMU 170-2 may draw electrical power from AC-DC converter 176, and may, in turn output a charging voltage and charging current suitable to charge the cells of PSA battery 174. The charging voltage and the charging current demands of the battery may be dependent on an electrochemistry or a cell configuration of the battery cells. The charging of the battery may be limited by the current supply capability of the DC source. In some embodiments, the DC source may be AC-DC converter 176. Once the battery reaches 100% state of charge, BMU 170-2 may stop drawing current from the AC-DC converter 176. When a boost source of power is desired, charging unit 246 may also be enabled to supply electrical from PSA battery 174, which is then boosted to a desired output voltage by DC boost converter 248 (see also FIGS. 3A and 3B).

In some embodiments, portable information handling system 100 may communicate with power storage adapter 172 to instruct PSA BMU 170-2 to charge the battery cells of PSA battery 174. As previously noted, PSA BMU 170-2 may send information to portable information handling system 100, such as the cell configuration, the state of charge of the battery, or other information. Portable information handling system 100 may communicate with PSA BMU 170-2 using a system management bus (not shown), for example System Management Bus (SMBus) promulgated by SBS Implementers Forum (www.smbus.org), in some embodiments.

In operation for a high efficiency charging method for lower power states, power storage adapter 172 may monitor a current supplied to port 230-1 when connected to portable information handling system 100 via variable power bus 142. Port 230-1 and variable power bus 142 may be compatible with USB Type-C to establish USB power delivery contracts between portable information handling system 100 and power storage adapter 172. The current monitored flowing to portable information handling system 100 at port 230-1 may be under the USB power delivery contract. However, portable information handling system 100 may draw substantially less power than specified in the USB power delivery contract, which may be undesirable for power storage adapter 172 to supply when power storage adapter 172 is not connected to AC line power 146, because of the inefficiency in providing low levels of electrical power, due to high relative losses in the power circuitry of power storage adapter 172. For example, portable information handling system 100 may be in a low power state, such as a sleep state or a standby state, during which portable information handling system 100 will draw a minimal amount of electrical power. Thus, the continued supply of low levels of electrical power under such conditions may result in smaller amounts of usable energy transferred to portable information handling system 100 (or another connected device) by PSA battery 174, as compared to a supply of electrical power at higher levels by power storage adapter 172. Therefore, power storage adapter 172 may detect that portable information handling system 100 is drawing electrical power below a low power threshold, which may be indicative of a low power state of portable information handling system 100. Then, power storage adapter 172 may terminate the USB power delivery contract, and establish a zero power delivery contract at port 230-1.

When power storage adapter 172 detects or determines that an SOC of internal battery 171 is below a specified threshold, such as a recharging SOC for internal battery 171, power storage adapter 172 may terminate the zero power delivery contract, and establish the previous USB power delivery contract and begin supplying power to portable information handling system 100 to charge internal battery 171 in a more efficient charging regime. Because the recharging SOC for internal battery 171 may about at 10% SOC, when the previous USB power delivery contract is reestablished, portable information handling system 100 will draw greater levels of electrical, as compared to the low power threshold, which will be efficient for increasing the overall run time of internal battery 171. In various embodiments, the recharging SOC may be about 30%, about 25%, about 20%, about 15%, about 10%, about 5%, or about 1%, or another value. In various implementations, the recharging SOC may be a user defined value between 1% and 99% and may depend upon various factors related to portable information handling system 100, such as user activity, user input, software application activity, software application type, or other input.

Figure 3A:
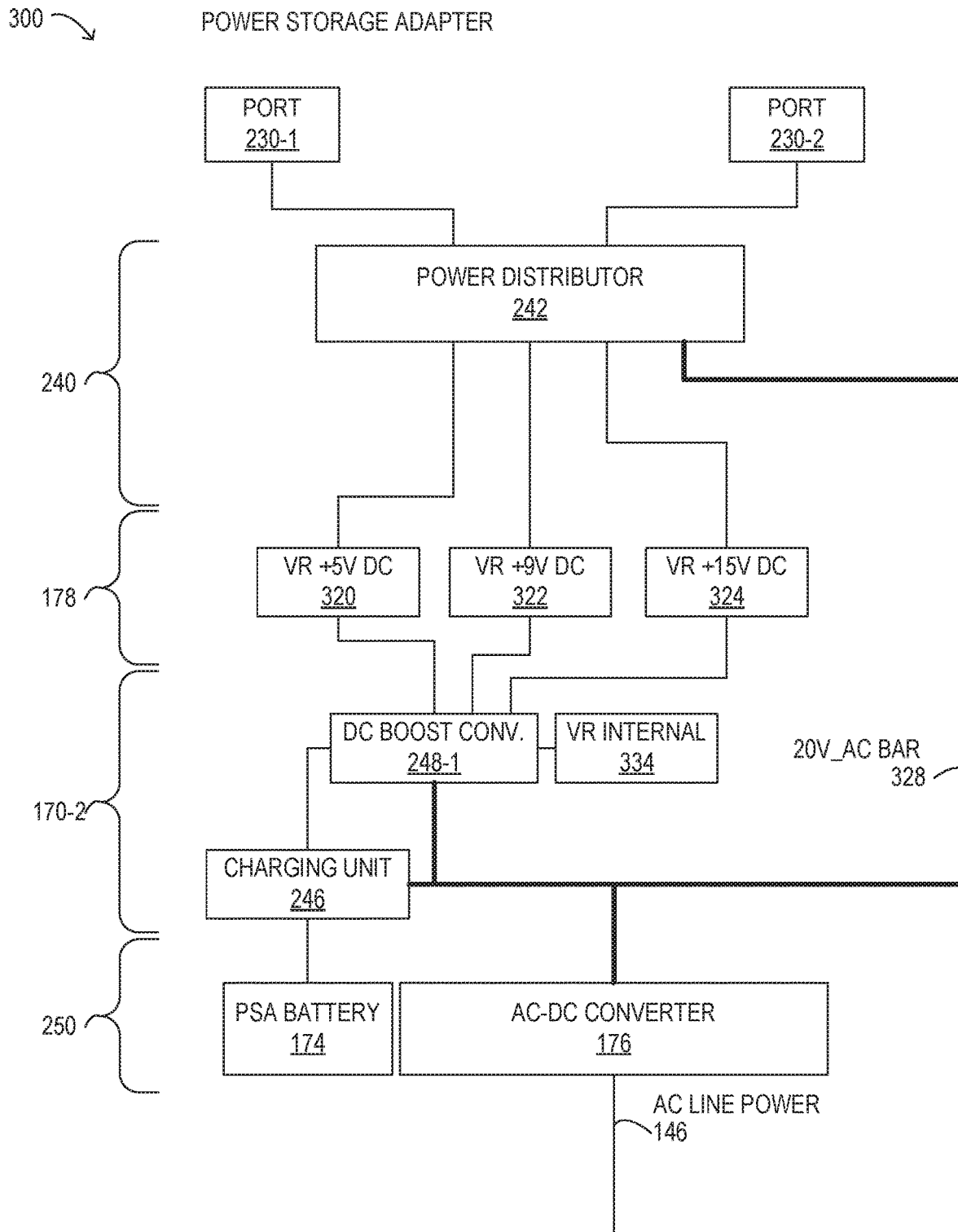
FIGS. 3A and 3B are a block diagrams of selected elements of embodiments of a power storage adapter.

Referring now to FIG. 3A, a power storage adapter 300 is illustrated in particular detail. Specifically, power storage adapter 300 is an embodiment of power storage adapter 172 shown in FIGS. 1 and 2 with particular elements and components illustrated. It is noted that FIG. 3A is not drawn to scale but is a schematic illustration. In various embodiments, power storage adapter 300 may be implemented using fewer or additional components than illustrated in FIG. 3A.

In FIG. 3A, AC-DC converter 176 receives AC line power 146 as a source of electrical energy. Among other functionality, AC-DC converter 176 may generate a regulated 20V output to a 20V_AC bar 328 that distributes the 20V to various different components included in power storage adapter 300. For example, AC-DC converter 176 may directly output regulated 20V via 20V_AC bar 328 to power distributor 242, which is shown included in VPB controller 240. As shown, power distributor 242 may be enabled to distribute electrical power to ports 230-1 and 230-2, which may be USB ports in particular embodiments. For example, power distributor 242 may include a cross connect switch, such as a matrix switch, among other elements, to distribute various power inputs to ports 230. In particular, power distributor 242 may implement OR functionality to provide a particular voltage output to one of ports 230-1 and 230-2, but not both ports 230. Because power delivery at ports 230 to a portable information handling system or another power consuming device may be governed by USB power delivery specifications, power storage adapter 300 may be implemented to limit supply of a particular voltage to a single one of ports 230 by refusing a request for a second supply of electrical power at the same voltage as is already being supplied to one of ports 230.

Although the OR functionality with respect to ports 230 may limit the possible power supply configurations of power storage adapter 300, in practice, because the power delivery capacity of power storage adapter 300 is finite, typical usage scenarios with portable information handling systems and other power consuming devices may rarely be constrained in actual practice for users of power storage adapter 300. For example, port 230-1 may be a USB Type-C port used to power a primary portable information handling system by a user, such as a Dell laptop computer or another brand of laptop computer. Then, the user may connect another power consuming device, such as a secondary portable information handling system that is a cellular telephone associated with the user, to port 230-2, which may be a USB Type-C or a USB Type-A port. Because the secondary portable information handling system may consume less electrical power than the primary information handling system, the secondary portable information handling system may negotiate and establish a USB power delivery contract for a lower power, and hence, at a lower voltage (see also Table 1) than the primary portable information handling system. Furthermore, because the primary portable information handling system may easily consume more than half of the electrical power supplied by power storage adapter 300, power storage adapter 300 may be constrained from simultaneously supplying two primary portable information handling systems because of the rated electrical power capability of power storage adapter 300.

As a result of the OR functionality with respect to ports 230 and 20V_AC bar 328, power storage adapter 300 may be implemented with fewer voltage regulators than other typical implementations or designs, such as other conventional USB Type-C power sources. As shown in FIG. 3A, power storage adapter 300 may implement three voltage regulators in DC-DC converter 178, corresponding to supply voltages specified by USB Type-C. Specifically, power storage adapter 300 may include a voltage regulator (VR)+5V DC 320, a VR+9V DC 322, and a VR+15V DC 324, each of which may be used for regulating an output voltage at either port 230-1 or 230-2. In conventional designs, each output port 230 is typically equipped with a set of VRs that are dedicated to the port. Because VRs have a power inefficiency of about 8-10%, the reduction in the number of VRs used in power storage adapter 300 may be a significant contribution to high efficiency operation. Accordingly, a DC boost converter 248-1 (included with PSA BMU 170-2) may provide a 5V output to VR+5V DC 320, a 9V output to VR+9V DC 322, and a 15V output to VR+15V DC 324.

Power distributor 242 may then selectively route the electrical power to individual ones of output ports 230. It is noted that ports 230 may be different types of ports, such as different types of USB ports. For example, port 230-1 may be a USB Type-C port, while port 230-2 may be a USB Type-A port.

Also in FIG. 3A, charging unit 246 may charge PSA battery 174 according to a charging curve (see also FIG. 4) and may receive 20V_AC bar 328 as a voltage source of power. As shown in further detail with respect to FIG. 4, charging unit 246 may be enabled to use a boost charging voltage that incrementally boosts a charging voltage of PSA battery 174. The use of the boost charging voltage by charging unit 246 may occur, in certain embodiments, when both ports 230 are disconnected and are not used for supplying power from power storage adapter 300. Additionally, charging unit 246 may supply electrical power from PSA battery 174 to DC boost converter 248-1, for example, when AC line power 146 is not connected and PSA battery 174 has a sufficient state of charge to supply electrical power. Also shown in a VR internal 334, which may be used by DC boost converter 248-1 for internal purposes.

Figure 3B:
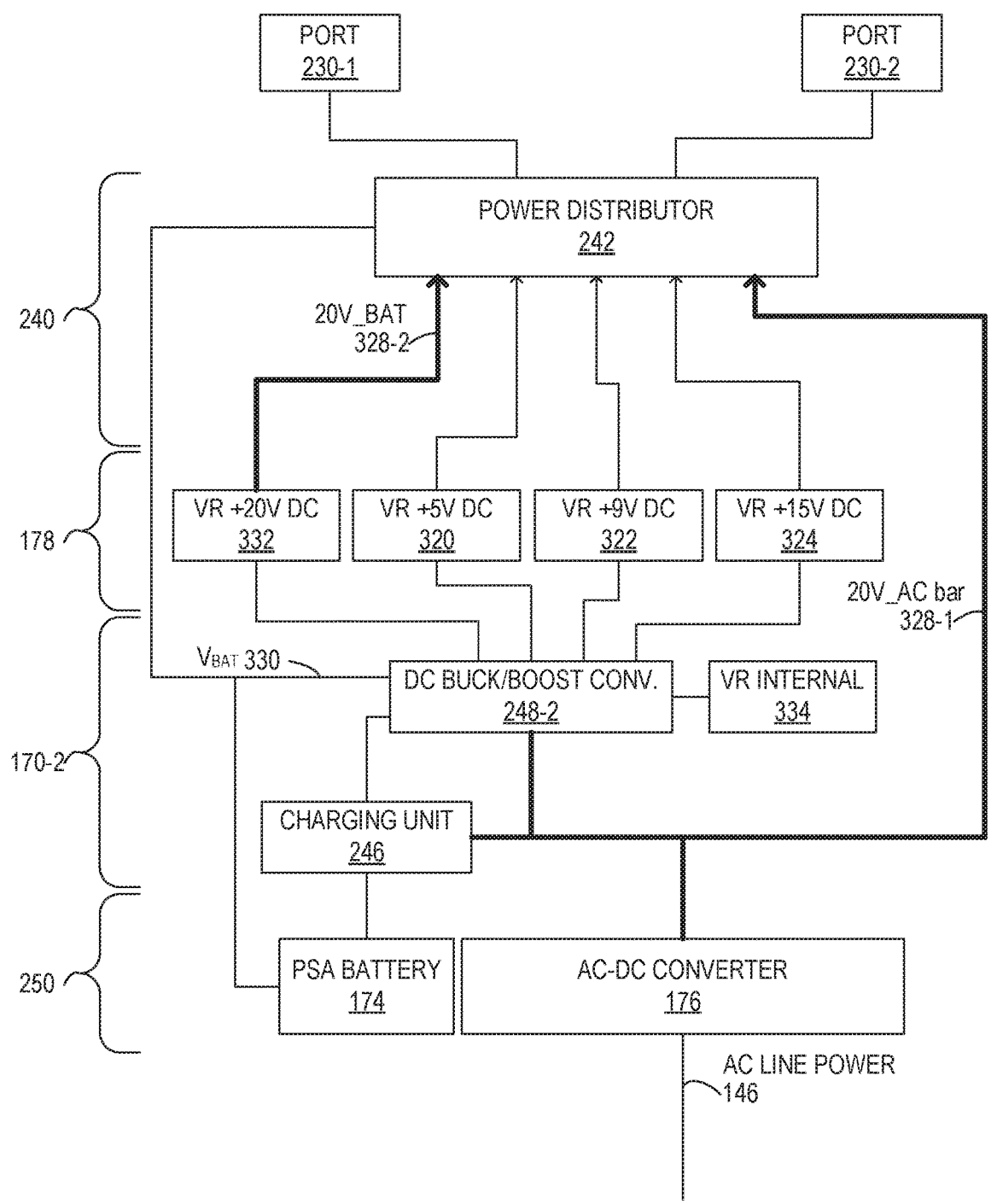

Referring now to FIG. 3B, a power storage adapter 301 is illustrated in particular detail. Specifically, power storage adapter 301 is an embodiment of power adapter 172 shown in FIGS. 1 and 2 with particular elements and components illustrated. It is noted that FIG. 3B is not drawn to scale but is a schematic illustration. In various embodiments, power storage adapter 301 may be implemented using fewer or additional components than illustrated in FIG. 3B.

In FIG. 3B, power storage adapter 301 is similar to power storage adapter 300 described above with respect to FIG. 3A and may operate as described above for power storage adapter 300. In FIG. 3B, power storage adapter 301 additionally shows a battery voltage $V_{BAT}$ 330 that is output directly from PSA battery 174 to a DC buck/boost converter 248-2.

When AC line power 146 is not connected, $V_{BAT}$ may be used from DC buck/boost converter 248-2 to generate a 20V_BAT voltage 328-2 using a VR+20V DC 332 for distribution by power distributor 242.

When AC line power 146 is connected, power distributor 242 may receive both 20V_AC bar 328-1 and 20V_BAT voltage 328-2 as a secondary source of boost electrical power, and may combine both sources of 20V electrical power to supply a boosted amount of electrical power. The boosted amount of electrical power supplied in this manner may exceed a nominal power rating for AC-DC converter 176, for example. While 20V_AC bar 328-1 supplies electrical power that is sourced from AC power line 146, the boost electrical power (20V_BAT 328-2) may be added to 20V_AC bar 328-1 as long as PSA battery 174 has sufficient SOC and AC line power 146 is connected and providing electrical power.

Additionally, power distributor 242 may also directly receive $V_{BAT}$ 330 from PSA battery 174, for example, when a different supply voltage than shown in Table 1 are supplied to one or more of PSA ports 230. For example, when portable information handling system 100 connected to PSA port 230-1 is enabled to receive $V_{BAT}$ 330 as a supply voltage, PSA adapter 301 may directly supply $V_{BAT}$ 330 as a source of electrical power. In this manner, electrical power supplied by PSA battery 174 may be output at a voltage that is more efficient for operation of PSA battery 174 (as compared to the fixed voltages in Table 1), which may be desirable for power efficient operation of power storage adapter 301, and of PSA battery 174. In particular, the direct supply of $V_{BAT}$ 330 at one of PSA ports 230 may occur when AC line power 146 is not connected and PSA battery 174 is the source of electrical power supplied by power storage adapter 301.

Figure 4:
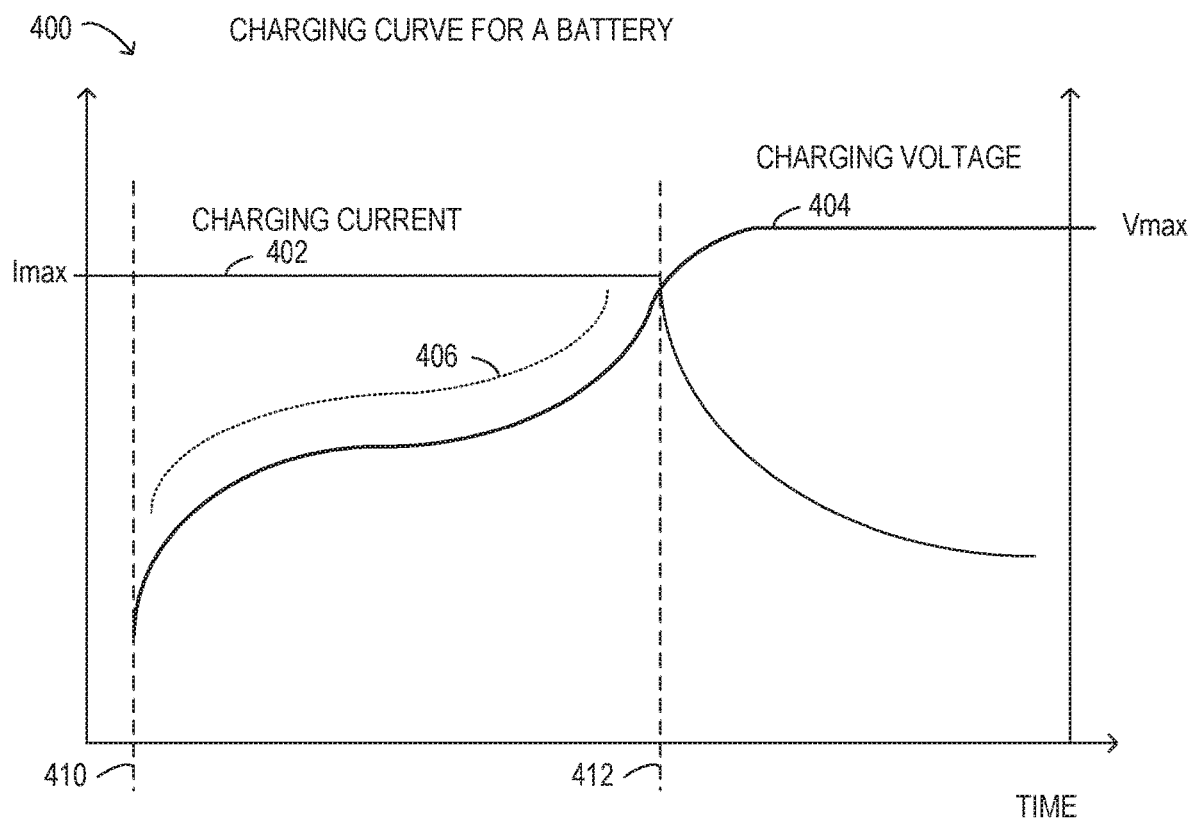
FIG. 4 is a plot showing selected elements of a charging curve for an information handling system battery.

FIG. 4 illustrates a charging curve 400 for a battery, such as internal battery 171 or PSA battery 174. Charging curve 400 is schematically illustrated and is not drawn to scale or perspective. Charging curve 400 may be implemented by BMU 170, for example, using charging unit 246 (see FIG. 2). Charging curve 400 depicts how a charging current 402 and a charging voltage 404 respond over time to various conditions. Specifically, at time 410, it is assumed that the battery is discharged and is charged by supplying charging current 402 that is constant, given by Imax, which is a maximum charging current. In the constant current charging regime between time 410 and time 412, charging voltage 404 may increase from a low value to a higher value as the SOC for the battery increases. At time 412, charging voltage 404 may approach a maximum value, given by Vmax, and may remain constant after time 412. At about time 412, meanwhile, charging current 402 may begin to decrease as the SOC for the battery increases at a lower rate. After time 412, in a constant voltage charging regime, charging current 402 may taper off until at some point, the SOC approaches a maximum value, and no further charging occurs.

In FIG. 4, time 410 may represent a recharging threshold. For example, time 410 may represent a point where the SOC of the battery is at about 10%. After time 410, the power draw for charging may be significantly greater than the low power threshold that is indicative of a low power state. Therefore, for high efficiency charging, it may be desirable to wait to charge the battery until the SOC is below the recharging SOC. Also shown in FIG. 4 is a boost charging voltage 406. Specifically, charging unit 246 may apply boost charging voltage 406 to improve a charging efficiency, for example, by reducing an amount of electrical power consumed during charging, as compared with supplying constant charging voltage Vmax.

In at least some embodiments, when power storage adapter 172 is connected to portable information handling system 100, it may be desirable for power storage adapter 172 to be aware of the SOC of internal battery 171. In some embodiments, power storage adapter 172 and portable information handling system 100 may communicate bidirectionally using variable power bus 142 to exchange various information, including an SOC for each of the respective batteries (internal battery 171 and PSA battery 174). In particular, when power storage adapter 172 and portable information handling system 100 include compatible communication and monitoring functionality to each other, power storage adapter 172 may simply query information handling system 100 for the SOC of internal battery 171 at any time. The communication between power storage adapter and portable information handling system 100 may also be associated with the low power state or transitions to and from the low power state. For example, when portable information handling system 100 enters a defined low power state, such as a hibernate state or a sleep state, portable information handling system 100 (specifically embedded controller 180) may communicate to power storage adapter 172 that zero power should be supplied. Similarly, when portable information handling system 100 exits the defined low power state, portable information handling system 100 (specifically embedded controller 180) may communicate to power storage adapter 172 that a high power state or a normal operational state is being entered and as a result, power storage adapter 172 and portable information handling system 100 may negotiate a power delivery contract to supply power from power storage adapter 172.

In some embodiments, when power storage adapter 172 and portable information handling system 100 do not include compatible communication and monitoring functionality to each other, power storage adapter 172 may still be able to ascertain the SOC of internal battery 171 by monitoring a current and a voltage at port 230-1 where portable information handling system 100 is connected (see FIG. 2). In some embodiments, power storage adapter 172 may monitor an electrical power at port 230-1. Then, the monitored current, voltage, or electrical power, can be correlated to charging curve 300 for internal battery 171. Power storage adapter 172 may know the values of charging curve 300 for internal battery 171 by recording the values during a previous charge cycle or previous operation with portable information handling system 100. In this manner, power storage adapter 172 may correlate the SOC of internal battery 171 without directly communicating with portable information handling system 100 to request or query the SOC. It is noted that the product of charging current 402 and charging voltage 404 will result in a charging power.

As previously noted, in some embodiments of the present disclosure, a PSA controller 221 may be configured to dynamically prioritize the allocation of electrical power supplied by power storage adapter 172 based on a battery charging prioritization policy, among other considerations. In one example embodiment, power storage adapter 172 may be connected to AC line power 146. Power storage adapter 172 may also be connected to information handling system 100 and another battery-powered device, such as a smart phone. The maximum power supply capacity of power storage adapter 172 may be 45 watts, and power storage adapter 172 may have negotiated a power delivery contract with information handling system 100 to supply 30 watts for its operation and/or for charging internal battery 170-1. In this example, because the remaining power capacity of power storage adapter 172 is only 15 watts, power storage adapter 172 may not be able supply enough electrical power to meet the demands of both information handling system 100 and the smart phone, much less to also charge the PSA battery 174, if charging of the PSA battery is needed. In this example, PSA controller 221 may be configured to prioritize supplying electrical power to handling system 100, to the smart phone, or for charging the PSA battery 174 based, at least in part, on a battery charging prioritization policy that specifies relative charging priorities for internal battery 170-1, for a battery of the smart phone, and for PSA battery 174. The relative charging priorities may be dependent on whether or not AC-DC convertor 176 is connected to an AC line power source.

If the SOC of PSA battery 174 is low relative to the SOC of internal battery 170-1, and depending on historical or predicted usage, PSA controller 221 may choose to prioritize supplying electrical power for charging PSA battery 174, at least temporarily. For example, in some embodiments, the power storage adapter 172 may be tasked with delivering 45 watts to information handling system 100 for 10 milliseconds out of every 100 milliseconds in a "turbo" mode. In this case, PSA controller 221 may pause the charging of PSA battery 174 for 10 milliseconds out of every 100 milliseconds, while supplying the maximum power supply capacity to information handling system 100, in order that the performance of information handling system 100 in the turbo mode is not reduced. In between turbo mode boosts, PSA controller 221 may allow the charging of PSA battery 174 to continue. In another embodiment, when tasked with delivering 45 watts to information handling system 100 for 10 milliseconds out of every 100 milliseconds in a turbo mode, PSA controller 221 may decide to continue charging PSA battery 174 until the SOC of PSA battery 174 reaches a predetermined threshold (e.g., a recharging threshold), after which the charging of PSA battery 174 may be paused or ceased altogether, thus prioritizing the performance of the system in the turbo mode over further charging of PSA battery 174.

In some embodiments, PSA controller 221 may determine a prioritization for supplying electrical power to particular connected devices or for charging the PSA battery based on learned behaviors or historical usage. For example, in the case of a user of an information handling system and a power storage adapter who is in the habit of using the system on long plane flights without connecting to an AC line power source, the PSA controller 221 may, while the user is in the airport, apply a battery charging prioritization policy that delivers 80% of the power supply capacity of the power storage adapter to information handling system 100 in order to allow the charging of internal battery 170-1 and allocates only 20% of the power supply capacity of the power storage adapter for other purposes, such as supplying electrical power to another connected device or (if connected to AC line power) for charging PSA battery 174. In another example, if PSA battery 174, the internal battery 170-1, or the battery of another device to which the power storage adapter is connected is deeply discharged (e.g., if the SOC of the battery is less than a predetermined threshold, such as 10% or 5%), PSA controller 221 may prioritize the supply of electrical power to the component with the deeply discharged battery for the amount of time it takes to charge the deeply discharged battery up to a predetermined level, e.g., a level that allows it to be operational In some embodiments, if two devices are connected to the power storage adapter and they are equally discharged, PSA controller 221 may decide to charge the battery of a first one of the devices up to a certain SOC that is less than fully charged and then charge the battery of the second device to that same SOC. The PSA controller 221 may then decide to charge the battery of the first device to a second (higher) SOC, followed by charging the second device to the second SOC, and so on. In yet another example, if the power storage adapter 174 were left in a car for two weeks and its battery is completely discharged, once the power storage adapter is connected to AC line power, the PSA controller 221 may determine that the PSA battery 174 should be charged to at least a predetermined minimal SOC level before the power storage adapter delivers power to any connected devices.

The mechanisms for prioritizing supplying electrical power to particular connected devices or for charging a PSA battery, as described herein, may be further illustrated by way of an example embodiment. In the example embodiment, the power storage adapter may be power limited. Therefore, the power storage adapter controller may have to determine how to allocate its available power supply capacity. The allocation may be based, at least in part, on the relative charging priorities of the battery-powered components of the system in which it operates. In the example embodiment, a portable information system, such as portable information handling system 100, that is connected to the power storage adapter may have the highest charging priority among the devices connected to the power storage adapter. Therefore, if the state of charge of the internal battery of the portable information handling system is below a predetermined battery SOC threshold, the power storage adapter may prioritize supplying electrical power to the portable information system, at least temporarily, regardless of the respective states of charge of the batteries of any other connected devices or the PSA battery. The tables below illustrate examples of decision matrices for determining relative priorities between the devices and batteries thereof to which the power storage adapter can supply electrical power.

In Table 2, it is assumed that the power storage adapter is connected to AC line power. The power storage adapter is also connected, through respective ports, to two battery-powered devices: a portable information handling system (CD1) and a smart phone (CD2). In this case, the available output power of the power storage adapter may be from 30-45 W, depending on current conditions, such as any power delivery contracts currently in force and the current demand/load on the power storage adapter.

TABLE 2

Battery Charge Prioritization with Power Storage Adapter Connected to AC Line Power

| SOC of PSA battery | SOC of connected device CD1 (portable IHS) | SOC of connected device CD2 (smart phone) | Action - charge prioritization |
|---|---|---|---|
| 80% | 5% | 5% | CD1, then CD2 |
| 5% | 80% | 5% | CD2, then PSA |
| 5% | 80% | 80% | PSA |
| 80% | 80% | 80% | CD1, then CD2 |

As shown in Table 2, the portable information handling system (CD1) may have the highest charging priority. Therefore, the power storage adapter may prioritize supplying power to the portable information handling system (CD1) so that its battery is charged first if its battery and one or both of the smart phone battery and the PSA battery also need to be charged. In this example, while the power storage adapter is connected to an AC line power source, the PSA battery may have the lowest charging priority. Therefore, the power storage adapter might not prioritize supplying power to charge the PSA battery until and unless the battery SOCs of the batteries of both the portable information handling system (CD1) and the smart phone (CD2) meet or exceed a particular battery SOC threshold (e.g., 80%).

In Table 3, it is assumed that the power storage adapter is not connected to AC line power. However, the power storage adapter is connected, through respective ports, to two battery-powered devices: a portable information handling system (CD1) and a smart phone (CD2). In this case, the available output power of the power storage adapter may be from 0-45 W, depending on current conditions, such as any power delivery contracts currently in force and the current demand/load on the power storage adapter.

TABLE 3

Battery Charge Prioritization Without AC Line Power

| SOC of PSA battery | SOC of connected device CD1 (portable IHS) | SOC of connected device CD2 (smart phone) | Action - charge prioritization |
|---|---|---|---|
| 80% | 5% | 5% | CD1, then CD2 |
| 80% | 80% | 5% | CD2 |
| 80% | 80% | 80% | No PSA discharge |

As shown in Table 3, the portable information handling system (CD1) may still have the highest charging priority, and the power storage adapter may prioritize supplying power to the portable information handling system (CD1) so that its battery is charged first if both its battery and the smart phone battery need to be charged. In this example, because the power storage adapter is not connected to an AC line power source, the power storage adapter might refrain from supplying any electrical power to the portable information handling system battery and/or to the smart phone if the battery SOC of the PSA battery is below a predetermined recharging threshold, even if the battery SOCs of one or both of the connected devices indicate that they should be charged. In addition, if the battery SOCs of all three batteries (i.e., the batteries of both connected devices and the PSA battery) meet or exceed a predetermined threshold, in this case 80%, the power storage adapter might not supply electrical power to the portable information handling system or the smart phone (for operation and/or for charging their batteries) in order to save power for subsequent use.

In other embodiments, different criteria may be used to prioritize the charging of an internal system battery of a portable information handling system, an external device battery or a power storage adapter battery. In some embodiments, the decision criteria, which may be embodied in a battery charging prioritization policy, may be based not only on current power delivery requests or contracts and the respective state of charge of each of the batteries, but also on actual loads, historical usage patterns, user input, connected device types, and/or any other relevant information.

While several example embodiments of the present disclosure are described herein in terms of a power storage adapter having two PSA ports, a power storage adapter may include more than two ports at which battery-powered devices can be connected to the power storage adapter. In such embodiments, the battery charging prioritization policy may specify relative priorities for particular types of devices (e.g., a portable information handling system, a smart phone, or another battery-powered accessory) that are connected to the power storage adapter or for devices connected to particular PSA ports. For example, if a portable information handling system is connected to the power storage adapter, it may have a higher charging priority than other types of devices connected to the power storage adapter. Similarly, if a smart phone is connected to the power storage adapter, it may have a higher charging priority than a storage device or another type of information handling accessory that is connected to the power storage adapter. In another example, a device connected to a particular one of the PSA ports may have a higher charging priority than devices connected to other ones of the PSA ports. Similarly, a device connected to a second one of the PSA ports may have a higher charging priority than a device connected to a third one of the PSA ports, and so on.

While the techniques for prioritizing supplying electrical power to multiple devices in a system are described in terms of example embodiments that include a power storage adapter, in other embodiments these techniques may be applied to another type of power source to which multiple battery-powered devices are connected. For example, if a power source cannot currently supply all of the electrical power requested by multiple connected devices (whether the electrical power is requested through a power delivery contract or by other means), the power source may prioritize, at least temporarily, supplying the maximum requested power to the highest priority connected device at the expense of other connected devices if its battery SOC indicates that it should be charged. On the other hand, the power source may prioritize, at least temporarily, supplying the maximum requested power to a lower priority device if its battery SOC indicates that it should be charged and the battery SOC of the highest priority device indicates that it does not need to be charged. Priority may be given to a selected device indefinitely, for a predetermined period of time, or until its battery SOC reaches a predetermined battery SOC threshold. In different embodiments, the battery SOC threshold below which the selected device maintains priority may be a battery SOC indicating that the battery is fully charged or may be a battery SOC indicating that the battery has reached an intermediate level of charge that is sufficient for supporting operation of the selected device, but is less than fully charged. If none of the batteries of the connected devices need to be charged, or if the power source cannot determine the battery SOCs of one or more of the connected devices, the power source may apply another type of prioritization policy to determine the portion of the requested electrical power to supply to each of the connected devices.

Figure 5:
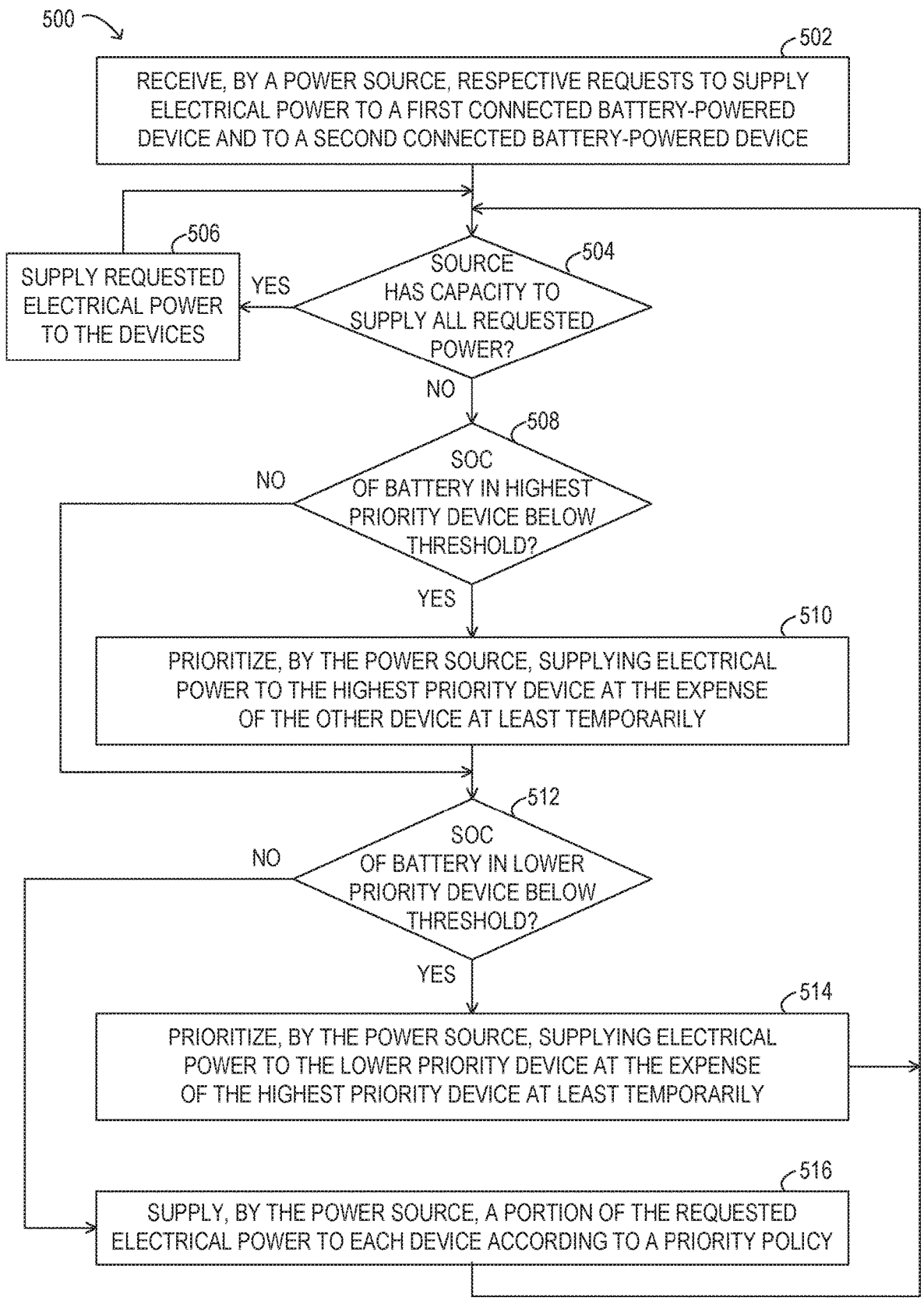
FIG. 5 is a flow chart of selected elements of a method for prioritizing supplying electrical power to battery-powered devices connected to a power source, according to some embodiments.

Referring now to FIG. 5, selected elements of an embodiment of method 500 for prioritizing supplying electrical power to battery-powered devices connected to a power source, as described herein, are depicted in flow chart form. Method 500 may be performed using portable information handling system 100 in conjunction with a power source. The power source may be similar to power storage adapter 172 (see, e.g., FIGS. 1, 2, 3A and 3B), or may be another type of adapter, in different embodiments. Method 500 may be performed when the power source is connected to two or more battery-powered devices having different charging priorities. For example, the connected device with the highest charging priority may be a portable information handling system (IHS), such as a laptop or tablet, and a connected device with a lower charging priority may be a mobile phone or another type of battery-powered accessory. It is noted that certain operations described in method 500 may be optional or may be rearranged, in different embodiments. In this example, it is assumed that information indicating the battery SOCs of the connected devices are available to the power source.

Method 500 may begin at, step 502, with receiving, by a power source, respective requests to supply electrical power to a first connected battery-powered device and to a second battery-powered device, where the first and second devices have different charging priorities. If, at 504, it is determined that the power source has enough power supply capacity to supply all of the power requested by the first and second devices, method 500 may proceed to 506. Otherwise, method 500 may proceed to 508. At 506, the power source may supply up to the maximum requested electrical power to the first and second devices, dependent on the current load or demand.

At 508, if the state of charge (SOC) of a battery in the connected device with the highest charging priority among the connected devices is below a first battery SOC threshold, such as a minimum SOC for efficient operation of the battery, method 500 may proceed to 510. Otherwise, method 500 may proceed to 512. At 510, the power source may prioritize supplying electrical power to the device with the highest charging priority at the expense of the other device at least temporarily. For example, the power source may supply the maximum requested electrical power to the device with the highest charging priority and an amount of electrical power that is less than the maximum requested electrical power to the other device until the SOC of the battery in the device with the highest charging priority meets or exceeds a second battery SOC threshold, such as a threshold above which the battery is considered fully charged (e.g., an SOC of 95% to 100%) or a threshold above which the battery is no longer prioritized for charging (e.g., an SOC of 80%). In another example, the power source may supply the maximum requested electrical power to the device with the highest charging priority and an amount of electrical power that is less than the maximum requested electrical power to the other device until the SOC of the battery in the device with the highest charging priority meets an intermediate threshold that exceeds the first battery SOC threshold but is less than the second battery SOC threshold. In yet another example, the power source may supply the maximum requested electrical power to the device with the highest charging priority and an amount of electrical power that is less than the maximum requested electrical power to the other device for a predetermined period of time. After supplying the maximum requested electrical power to the device with the highest charging priority at least temporarily, method 500 may continue at 512.

If, at 512, the SOC of a battery in the device with a lower charging priority is below a first battery SOC threshold, such as a minimum SOC for efficient operation of the battery, method 500 may proceed to 514. Otherwise, method 500 may proceed to 516. At 514, the power source may prioritize supplying electrical power to the device with the lower charging priority at the expense of the device with the highest charging priority at least temporarily. For example, the power source may supply the maximum requested electrical power to the device with the lower charging priority and an amount of electrical power that is less than the maximum requested electrical power to the device with the highest charging priority until the SOC of the battery in the device with the lower charging priority meets or exceeds a second battery SOC threshold, such as a threshold above which the battery is considered fully charged (e.g., an SOC of 95% to 100%) or a threshold above which the battery is no longer prioritized for charging (e.g., an SOC of 80%). In another example, the power source may supply the maximum requested electrical power to the device with the lower charging priority and an amount of electrical power that is less than the maximum requested electrical power to the device with the highest charging priority until the SOC of the battery in the device with the lower charging priority meets an intermediate threshold that exceeds the first battery SOC threshold but is less than the second battery SOC threshold. In yet another example, the power source may supply the maximum requested electrical power to the device with the lower charging priority and an amount of electrical power that is less than the maximum requested electrical power to the device with the highest charging priority for a predetermined period of time. After supplying the maximum requested electrical power to the device with the lower charging priority at least temporarily, method 500 may continue at 516.

At 516, the method may include the power source supplying a portion of the requested electrical power to each of the two connected devices according to a priority policy. This may include supplying the maximum requested power to one of the connected devices at the expense of the other connected device, at least temporarily, or may include supplying less than the maximum requested power to both of the connected devices, in different embodiments. In the illustrated embodiment, some or all of the operations of method 500 may be repeated periodically, or in response to changing conditions, to reassess and, potentially, to reprioritize how power is supplied to the connected devices by the power source. For example, in some embodiments, when the power source does not have enough power supply capacity to supply all of the power requested by the first and second devices, and the battery SOCs of both devices are below the first or second battery SOC thresholds, the power source may alternate between prioritizing supplying electrical power to the first device and prioritizing supplying electrical power to the second device until the battery SOC of at least one of the devices exceeds the first or second battery SOC threshold or until the power supply capacity of the power source or the amount of power requested by the first and/or second devices changes.

Figure 6:
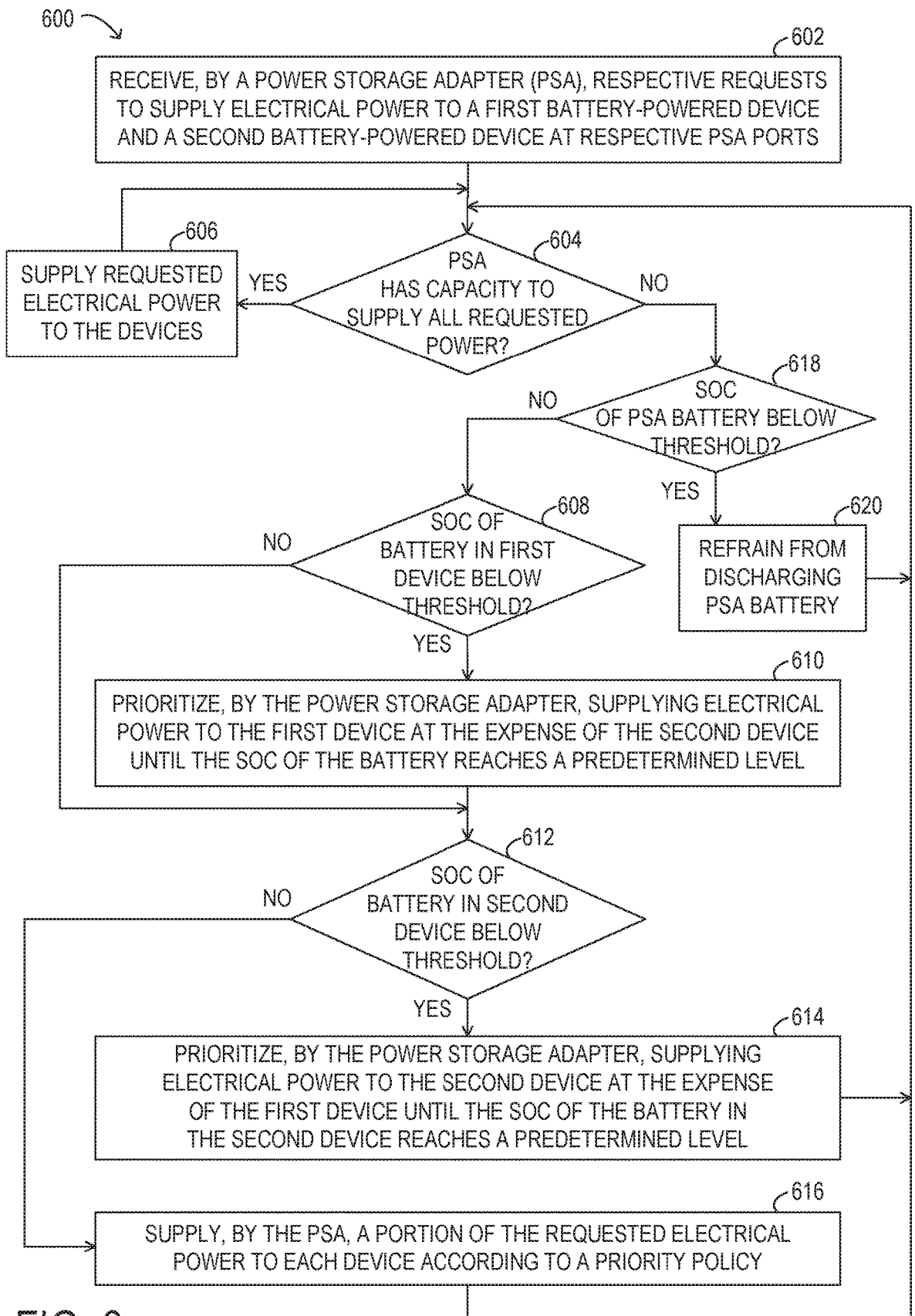
FIG. 6 is a flow chart of selected elements of a method for prioritizing supplying electrical power to battery-powered devices connected to a power storage adapter when AC line power is not available, according to some embodiments

Referring now to FIG. 6, selected elements of an embodiment of method 600 for prioritizing supplying electrical power to battery-powered devices connected to a power storage adapter when AC line power is not available, as described herein, are depicted in flow chart form. Method 600 may be performed using portable information handling system 100, in conjunction with power storage adapter 172 (see, e.g., FIGS. 1, 2, 3A and 3B) and, in particular, by PSA controller 221. Method 600 may be performed when the power storage adapter is connected to two or more battery-powered devices, where a first connected battery-powered device has a higher charging priority than a second connected battery-powered device. In some embodiments, method 600 may be performed when power storage adapter 172 is connected to portable information handling system (IHS) 100, as the first device, via port 230-1 to variable power bus 142 and is connected to a second battery-powered device via port 230-2 to variable power bus 142. For example, the first device may be a laptop or tablet computer, and the second device may be a smart phone, a storage device, or another type of battery-powered accessory. It is noted that certain operations described in method 600 may be optional or may be rearranged, in different embodiments. In this example, it is assumed that information indicating the battery SOCs of the connected devices may be obtained or received by the power storage adapter from the connected devices over variable power bus 142.

Method 600 may begin, at 602, with receiving, by a power storage adapter (PSA) that is not connected to AC line power, respective requests to supply electrical power to a first battery-powered device and to a second battery-powered device that are connected to the power storage adapter at respective PSA ports. In this example, the first device may have a higher charging priority than the second device. If, at 604, it is determined that the power storage adapter has enough power supply capacity to supply all of the power requested by the first and second devices, method 600 may proceed to 606. Otherwise, method 600 may proceed to 618. At 606, the power storage adapter may supply up to the maximum requested electrical power to the first and second devices, dependent on the current load or demand.

If, at 618, it is determined that the SOC of the PSA battery is below a predetermined SOC threshold for the PSA battery, such as an SOC below which the PSA battery is unable to supply electrical power to any connected devices, method 600 may proceed to 620. Otherwise, method 600 may proceed to 608. At 620, the method may include refraining from discharging the PSA battery for any reason. At 608, if the SOC of a battery in the first device is below a first battery SoC threshold, such as a minimum SOC for efficient operation of the battery, method 600 may proceed to 610. Otherwise, method 600 may proceed to 612. At 610, the power storage adapter may prioritize supplying electrical power to the first device at the expense of the second device until the SOC of the battery in the first device reaches a predetermined level. For example, the power storage adapter may supply the maximum requested electrical power to the first device and an amount of electrical power that is less than the maximum requested electrical power to the second device until the SOC of the battery in the first device meets or exceeds the first battery SOC threshold, meets or exceeds a second battery SOC threshold, such as a threshold above which the battery is considered fully charged (e.g., an SOC of 95% to 100%) or a threshold above which the battery is no longer prioritized for charging (e.g., an SOC of 80%), or reaches an intermediate threshold between the first and second battery SOC thresholds. In other embodiments, the power storage adapter may supply the maximum requested electrical power to the first device and an amount of electrical power that is less than the maximum requested electrical power to the second device for a predetermined period of time.

If, at 612, the SOC of the battery in second device is below a first battery SoC threshold, such as a minimum SOC for efficient operation of the battery, method 600 may proceed to 614. Otherwise, method 600 may proceed to 616. At 614, the power storage adapter may prioritize supplying electrical power to the second device at the expense of the first device until the SOC of the battery in the second device reaches a predetermined level. For example, the power storage adapter may supply the maximum requested electrical power to the second device and an amount of electrical power that is less than the maximum requested electrical power to the first device until the SOC of the battery in the second device meets or exceeds the first battery SOC threshold, meets or exceeds a second battery SOC threshold, such as a threshold above which the battery is considered fully charged (e.g., an SOC of 95% to 100%) or a threshold above which the battery is no longer prioritized for charging (e.g., an SOC of 80%), or reaches an intermediate threshold between the first and second battery SOC thresholds. In other embodiments, the power storage adapter may supply the maximum requested electrical power to the second device and an amount of electrical power that is less than the maximum requested electrical power to the first device for a predetermined period of time.

At 616, the method may include the power storage adapter supplying a portion of the requested electrical power to each of the first and second connected devices according to a priority policy. This may include supplying the maximum requested power to one of the devices at the expense of the other device, at least temporarily, or may include supplying less than the maximum requested power to both of the devices, in different embodiments. In the illustrated embodiment, some or all of the operations of method 600 may be repeated periodically, or in response to changing conditions, to reassess and, potentially, to reprioritize how power is supplied to the first and second devices by the power storage adapter. For example, in some embodiments, when the SOC of the PSA battery exceeds a predetermined SOC threshold for the PSA battery but the power storage adapter does not have enough power supply capacity to supply all of the power requested by the first and second devices, and the battery SOCs of both devices are below the first or second battery SOC thresholds, the power storage adapter may alternate between prioritizing supplying electrical power to the first device and prioritizing supplying electrical power to the second device until the battery SOC of at least one of the devices exceeds the first or second battery SOC threshold, until the power supply capacity of the power storage adapter is insufficient to supply electrical power to the devices, or until the amount of power requested by the first and/or second devices changes.

Figure 7:
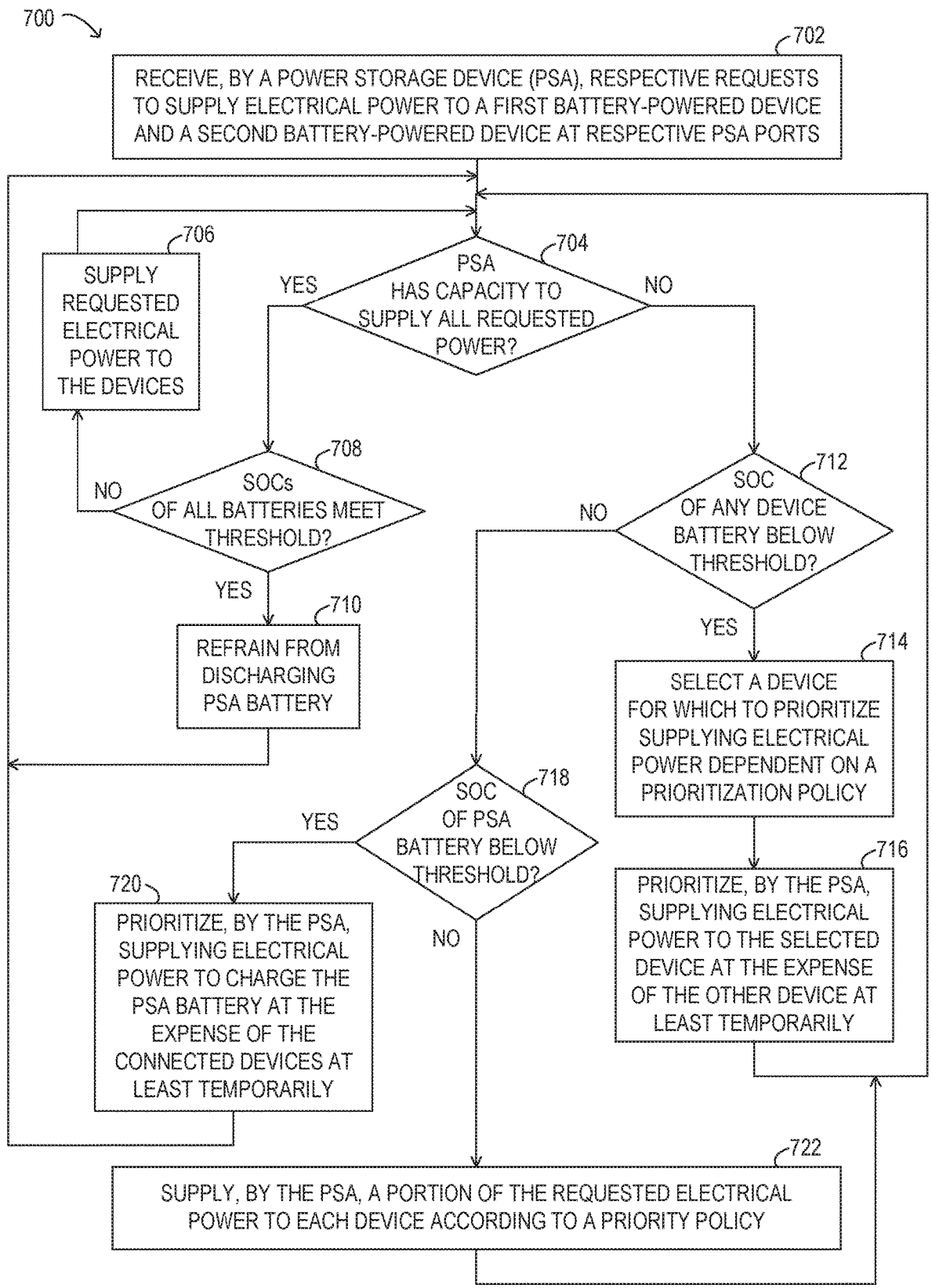
FIG. 7 is a flow chart of selected elements of a method for prioritizing supplying electrical power to battery-powered devices connected to a power storage adapter when AC line power is available, according to some embodiments.

Referring now to FIG. 7, selected elements of an embodiment of method 700 for prioritizing supplying electrical power to battery-powered devices connected to a power storage adapter when AC line power is available, as described herein, are depicted in flow chart form. Method 700 may be performed using portable information handling system 100, in conjunction with power storage adapter 172 (see, e.g., FIGS. 1, 2, 3A and 3B) and, in particular, by PSA controller 221. Method 700 may be performed when the power storage adapter is connected to two or more battery-powered devices, where a first connected battery-powered device has a higher charging priority than a second connected battery-powered device. In at least some embodiments, the PSA battery may have a lower charging priority than the batteries of any or all battery-powered devices connected to the power storage adapter. In some embodiments, method 700 may be performed when power storage adapter 172 is connected to portable information handling system (IHS) 100, as the first device, via port 230-1 to variable power bus 142 and is connected to a second battery-powered device via port 230-2 to variable power bus 142. For example, the first device may be a laptop or tablet computer, and the second device may be a smart phone, a storage device, or another type of battery-powered accessory. It is noted that certain operations described in method 700 may be optional or may be rearranged in different embodiments. In this example, it is assumed that information indicating the battery SOCs of the connected devices may be obtained or received by the power storage adapter from the connected devices over variable power bus 142.

Method 700 may begin, at 702, with receiving, by a power storage adapter (PSA) that is connected to AC line power, respective requests to supply electrical power to a first battery-powered device and a second battery-powered device that are connected to the power storage adapter at respective PSA ports. In this example, the first device may have a higher charging priority than the second device. If, at 704, it is it is determined that the power storage adapter has enough power supply capacity to supply all of the power requested by the first and second devices, method 700 may proceed to 708. Otherwise, method 700 may proceed to 712. If, at 708, it is determined that the battery SOCs of the PSA battery and the batteries in the first and second devices meet or exceed respective battery SOC thresholds, such as a recharging SOC for the PSA battery and a minimum SOC for efficient operation of the batteries in the first and second devices, method 700 may proceed to 710. Otherwise, method 700 may proceed to 706. At 706, the power storage adapter may supply up to the maximum requested electrical power to the first and second devices, dependent on the current load or demand. At 710, the method may include the power storage adapter refraining from discharging PSA battery.

If, at 712, it is determined that the SOC of any one or more of the batteries of the first device and/or the second device is below a first battery SoC threshold, such as a minimum SOC for efficient operation of the battery, method 700 may proceed to 714. Otherwise, method 700 may proceed to 718. At 714, the method may include selecting a device for which to prioritize supplying electrical power dependent on a prioritization policy. For example, the first device may have a higher charging priority than the second device and may initially be selected for prioritization over the second device. At 718, the method may include prioritizing, by the power storage adapter, supplying electrical power to the selected device at the expense of the other device at least temporarily. For example, the power storage adapter may supply the maximum requested electrical power to the selected device and an amount of electrical power that is less than the maximum requested electrical power to the other device until the SOC of the battery in the selected device meets or exceeds the first battery SOC threshold, meets or exceeds a second battery SOC threshold, such as a threshold above which the battery is considered fully charged (e.g., an SOC of 95% to 100%) or a threshold above which the battery is no longer prioritized for charging (e.g., an SOC of 80%), or reaches an intermediate threshold between the first and second battery SOC thresholds. In other embodiments, the power storage adapter may supply the maximum requested electrical power to the selected device and an amount of electrical power that is less than the maximum requested electrical power to the other device for a predetermined period of time.

If, at 718, the SOC of the PSA battery is below a battery SOC threshold for the PSA battery, such as a recharging threshold, method 700 may proceed to 720. Otherwise, method 700 may proceed to 722. At 720, the method may include prioritizing, by the power storage adapter, supplying electrical power to charge the PSA battery at the expense of the connected devices at least temporarily. For example, the power storage adapter may supply a portion of the requested electrical power to each of the first and second connected devices according to a priority policy until the SOC of the PSA battery meets or exceeds the battery SOC threshold for the PSA battery. This may include supplying the maximum requested power to one of the devices at the expense of the other device, at least temporarily, or may include supplying less than the maximum requested power to both of the devices, in different embodiments. At 722, the method may include supplying, by the power storage adapter, a portion of the requested electrical power to each of the first and second connected devices according to a priority policy. This may include supplying the maximum requested power to one of the devices at the expense of the other device, at least temporarily, or may include supplying less than the maximum requested power to both of the devices, in different embodiments.

In the illustrated embodiment, some or all of the operations of method 700 may be repeated periodically, or in response to changing conditions, to reassess and, potentially, to reprioritize how power is supplied to the first and second devices by the power storage adapter. For example, in some embodiments, when the power storage adapter does not have enough power supply capacity to supply all of the power requested by the first and second devices, and the battery SOCs of the batteries of both of the connected devices are below respective battery SOC thresholds, the power storage adapter may alternate between prioritizing supplying electrical power to the battery of the first device and prioritizing supplying electrical power to the battery of the second device until the battery SOC of at least one of the devices exceeds the first or second battery SOC threshold, after which the power storage adapter may prioritize supplying electrical power to the PSA battery, if the SOC of the PSA battery is below a battery SOC threshold, such as a recharging threshold for the PSA battery.

While techniques for prioritizing supplying electrical power to various components of a system that includes a power storage adapter have been described herein in terms of an information handling system and another battery-powered device, such as a smart phone, that are connected to the power storage adapter, in other embodiments these techniques may be applied when any two devices are connected to the ports of the power storage adapter in order that the power storage adapter can supply electrical power to operate those devices and/or charge their batteries. Any suitable prioritization criteria including, but not limited to, the criteria described herein, may be used to determine which batteries, if any, should be charged by the power storage adapter and when.

As disclosed herein, a power storage adapter (PSA) may include multiple PSA ports, an AC-DC converter, a PSA battery, and a PSA controller. The power storage adapter may be connected to multiple battery-powered devices through respective ones of the PSA ports. The PSA controller may be configured to receive respective requests to supply electrical power to a first device and to a second device, to determine that the power storage adapter does not have sufficient power supply capacity to satisfy both requests, to determine that a respective state of charge (SOC) of the battery of at least one of the connected devices is below a first battery SOC threshold, and to prioritize, at least temporarily, supplying electrical power to a selected one of the connected devices at the expense of the other connected device based on a battery charging prioritization policy. The selected device may maintain its priority until the battery SOC exceeds a particular battery SOC threshold or for a predetermined period of time, after which the unselected device may be prioritized, at least temporarily, if the battery SOC of the unselected device is below the first battery SOC threshold. The battery charging prioritization policy may specify relative charging priorities for the batteries of the first and second connected devices and the PSA battery based, at least in part, on whether or not the power storage adapter is connected to an AC line power source. For example, when AC line power is available, the PSA battery may have a lower charging priority than the batteries of the connected devices.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power storage adapter (PSA), comprising:
    a plurality of PSA ports;
    an AC-DC converter;
    a PSA battery; and
    a PSA controller having access to memory media storing instructions executable by the PSA controller to:
        receive respective requests to supply electrical power to a first battery-powered device at a first PSA port and to a second battery-powered device at a second PSA port, each request specifying a requested amount of electrical power to be supplied by the power storage adapter;
        determine that the power storage adapter does not have sufficient power supply capacity to satisfy both requests;
        determine that a respective state of charge (SOC) of at least one of a first battery of the first battery-powered device and a second battery of the second battery-powered device is below a first predetermined SOC threshold;
        prioritize supplying electrical power to a selected one of the first battery-powered device and the second battery-powered device at the expense of an unselected one of the first battery-powered device and the second battery-powered device dependent on a predetermined battery charging prioritization policy, the state of charge of the selected device being below the first predetermined SOC threshold; and
        subsequent to prioritizing supplying electrical power to the selected device, prioritize supplying electrical power to the PSA battery at the expense of the selected device and the unselected device dependent on the predetermined battery charging prioritization policy;
    wherein the battery charging prioritization policy specifies relative charging priorities for the first battery, the second battery and the PSA battery, the relative charging priorities being dependent on whether or not the AC-DC convertor is connected to an AC line power source, and prioritizing supplying electrical power to the selected device comprises supplying an amount of electrical power to the unselected device that is less than the electrical power requested for the unselected device.

2. The power storage adapter of claim 1, wherein prioritizing supplying electrical power to the selected device comprises prioritizing supplying electrical power to the selected device until the state of charge of the battery of the selected device meets or exceeds the first predetermined SOC threshold.

3. The power storage adapter of claim 1, wherein prioritizing supplying electrical power to the selected device comprises prioritizing supplying electrical power to the selected device until the state of charge of the battery of the selected device meets or exceeds a second predetermined SOC threshold, the second predetermined SOC threshold being higher than the first predetermined SOC threshold.

4. The power storage adapter of claim 1, wherein prioritizing supplying electrical power to the selected device comprises prioritizing supplying electrical power to the selected device for a predetermined period of time.

5. The power storage adapter of claim 1, wherein determining that a respective SOC of at least one of the first battery and the second battery is below a first predetermined SOC threshold comprises at least one of:
    querying the first battery-powered device to obtain data representing the state of charge of the first battery; and
    querying the second battery-powered device to obtain data representing the state of charge of the second battery.

6. The power storage adapter of claim 1, wherein the instructions are further executable by the PSA controller to:
    determine that the state of charge of the unselected device is below the first predetermined SOC threshold; and
    subsequent to prioritizing supplying electrical power to the selected device, prioritize supplying electrical power to the unselected device at the expense of the selected device.

7. The power storage adapter of claim 1, wherein prioritizing supplying electrical power to the selected device comprises supplying an amount of electrical power to the selected device equal to the electrical power requested for the selected device.

8. The power storage adapter of claim 1, wherein the instructions are further executable by the PSA controller to, subsequent to prioritizing supplying electrical power to the selected device:
    determine that the respective state of charge of each of the first battery and the second battery exceeds the first predetermined SOC threshold;

cause the power storage adapter to supply to the first battery-powered device, in accordance with the predetermined battery charging prioritization policy, an amount of electrical power that is less than the electrical power requested for the first battery-powered device; and cause the power storage adapter to supply to the second battery-powered device, in accordance with the predetermined battery charging prioritization policy, an amount of electrical power that is less than the electrical power requested for the second battery-powered device.

9. The power storage adapter of claim 1, wherein:
prioritizing supplying electrical power to the PSA battery at the expense of the selected device and the unselected device is performed while the AC-DC converter is connected to an AC line power source.

10. The power storage adapter of claim 1, wherein:
the first battery-powered device is a portable information handling system;
the first battery is an internal battery of the portable information handling system; and
the battery charging prioritization policy specifies that a charging priority of the internal battery of the portable information handling system is higher than a charging priority of the second battery when the state of charge of the internal battery and the state of charge of the second battery are below the first predetermined SOC threshold.

11. The power storage adapter of claim 1, wherein the instructions are further executable by the PSA controller to:
determine that a state of charge of the PSA battery is below a predetermined recharging threshold for the PSA battery; and
prioritize supplying electrical power to the PSA battery at the expense of the selected device and the unselected device.

12. A method, comprising:
receiving, by a power source comprising an AC-DC converter and an integrated battery, respective requests to supply electrical power to a first battery-powered device connected to the power source and to a second battery-powered device connected to the power source, each request specifying a requested amount of electrical power to be supplied by the power source;
determining that the power source does not have sufficient power supply capacity to satisfy both requests;
determining that a respective state of charge (SOC) of at least one of a first battery of the first battery-powered device and a second battery of the second battery-powered device is below a first predetermined SOC threshold; and
prioritizing supplying electrical power to a selected one of the first battery-powered device and the second battery-powered device at the expense of an unselected one of the first battery-powered device and the second battery-powered device dependent on a predetermined battery charging prioritization policy, the state of charge of the selected device being below the first predetermined SOC threshold; and
subsequent to prioritizing supplying electrical power to the selected device, prioritizing supplying electrical power to the integrated battery at the expense of the selected device and the unselected device dependent on the predetermined battery charging prioritization policy;

wherein the battery charging prioritization policy specifies relative charging priorities for the first battery, the second battery and the integrated battery, the relative charging priorities being dependent on whether or not the AC-DC converter is connected to an AC line power source, and prioritizing supplying electrical power to the selected device comprises supplying an amount of electrical power to the unselected device that is less than the electrical power requested for the unselected device.

13. The method of claim 12, wherein prioritizing supplying electrical power to the selected device comprises prioritizing supplying electrical power to the selected device until the state of charge of the battery of the selected device meets or exceeds the first predetermined SOC threshold.

14. The method of claim 12, wherein prioritizing supplying electrical power to the selected device comprises prioritizing supplying electrical power to the selected device until the state of charge of the battery of the selected device meets or exceeds a second predetermined SOC threshold, the second predetermined SOC threshold being higher than the first predetermined SOC threshold.

15. The method of claim 12, wherein prioritizing supplying electrical power to the selected device comprises prioritizing supplying electrical power to the selected device for a predetermined period of time.

16. The method of claim 12, wherein determining that a respective SOC of at least one of the first battery and the second battery is below a first predetermined SOC threshold comprises at least one of:
querying the first battery-powered device to obtain data representing the state of charge of the first battery; and
querying the second battery-powered device to obtain data representing the state of charge of the second battery.

17. The method of claim 12, wherein:
the state of charge of the unselected device is below the first predetermined SOC threshold; and
the method further comprises, subsequent to prioritizing supplying electrical power to the selected device, prioritizing supplying electrical power to the unselected device at the expense of the selected device.

18. The method of claim 12, wherein prioritizing supplying electrical power to the selected device comprises supplying an amount of electrical power to the selected device equal to the electrical power requested for the selected device.

19. The method of claim 12, further comprising, subsequent to prioritizing supplying electrical power to the selected device:
determining that the respective state of charge of each of the first battery and the second battery exceeds the first predetermined SOC threshold;
causing the power source to supply to the first battery-powered device, in accordance with the predetermined battery charging prioritization policy, an amount of electrical power that is less than the electrical power requested for the first battery-powered device; and
causing the power source to supply to the second battery-powered device, in accordance with the predetermined battery charging prioritization policy, an amount of electrical power that is less than the electrical power requested for the second battery-powered device.

20. The method of claim 12, wherein:
prioritizing supplying electrical power to the integrated battery at the expense of the selected device and the unselected device is performed while the AC-DC converter is connected to an AC line power source.

* * * * *